United States Patent
Yamada et al.

[11] Patent Number: 5,212,516
[45] Date of Patent: May 18, 1993

[54] AUTOMATIC FOCUS ADJUSTING DEVICE

[75] Inventors: Kunihiko Yamada, Tokyo; Akihiro Fujiwara, Kanagawa; Hirofumi Suda, Kanagawa; Masamichi Toyama, Kanagawa; Kitahiro Kaneda, Kanagawa, all of Japan

[73] Assignee: Canon Kabushiki Kaisha, Tokyo, Japan

[21] Appl. No.: 834,971

[22] Filed: Feb. 11, 1992

Related U.S. Application Data

[63] Continuation of Ser. No. 500,297, Mar. 27, 1990, abandoned.

[30] Foreign Application Priority Data

Mar. 28, 1989 [JP] Japan ............................... 1-077063
Apr. 11, 1989 [JP] Japan ............................... 1-091143
Apr. 21, 1989 [JP] Japan ............................... 1-102344

[51] Int. Cl.$^5$ ............................... G03B 13/00
[52] U.S. Cl. ............................... 354/402; 358/227
[58] Field of Search ............................... 354/400–409; 358/227; 250/201.2, 201.7

[56] References Cited
U.S. PATENT DOCUMENTS
4,804,831 2/1989 Baba et al. ............................... 354/402

Primary Examiner—Michael L. Gellner
Assistant Examiner—David M. Gray
Attorney, Agent, or Firm—Robin, Blecker, Daley & Driscoll

[57] ABSTRACT

An automatic focus adjusting device comprises an image sensor arranged to convert into a video signal an object image formed on its image sensing plane by a photo-taking lens optical system and to produce the video signal; a circuit which detects a high-frequency component included in the video signal; a circuit which detects from the video signal the degree of sharpness of the image on the basis of the width of the edge part of the image; a driving circuit which changes the position of the optical system relative to the image sensing plane in the direction in which the detection output of the high-frequency component and that of the degree of sharpness increase; and a control circuit which controls the driving speed of the driving circuit according to the detection output of the degree of sharpness.

30 Claims, 15 Drawing Sheets

FIG.12

H:FOCUSING LENS DRIVING MOTOR → HIGH SPEED
M:FOCUSING LENS DRIVING MOTOR → MEDIUM SPEED
L:FOCUSING LENS DRIVING MOTOR → LOW SPEED

| OUTPUT LEVEL \ AREA | p | q | r |
|---|---|---|---|
| OUTPUT LEVEL OF BPF FA | GREAT | GREAT | GREAT |
| OUTPUT LEVEL OF BPF FB | GREAT | GREAT | LITTLE |
| OUTPUT LEVEL OF BPF FC | GREAT | LITTLE | LITTLE |
| DRIVING SPEED | LOW | MEDIUM | HIGH |

FIG.2

ΔX: EDGE WIDTH

ΔI: LUMINANCE DIFFERENCE

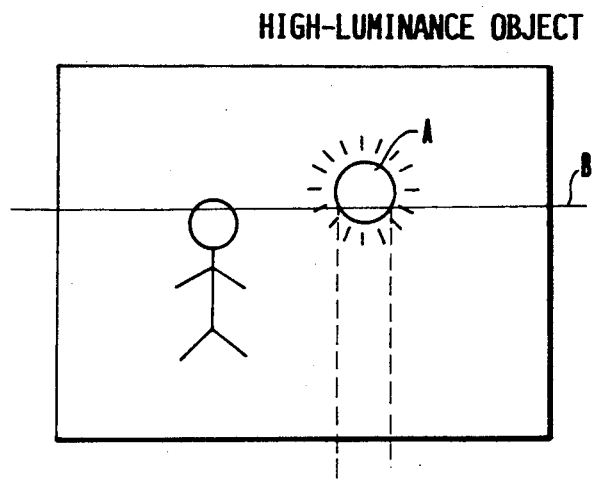
FIG.10(a)
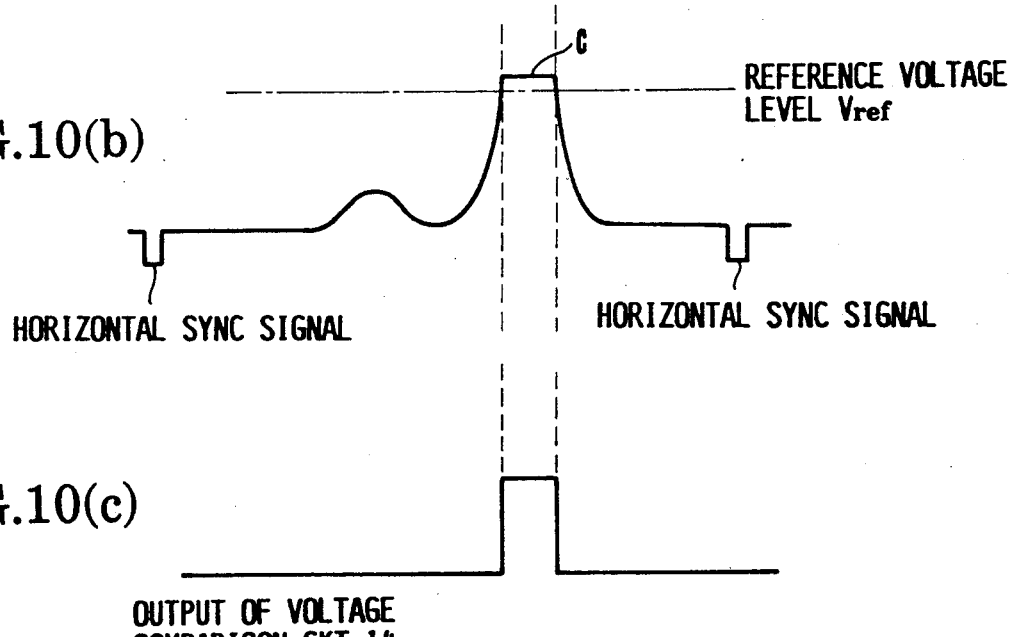
FIG.10(b)
FIG.10(c)

AUTOMATIC FOCUS ADJUSTING DEVICE

This is a continuation of application under 37 CFR 1.62 of prior application Ser. No. 500,297, filed Mar. 27, 1990, now abandoned.

DESCRIPTION OF THE RELATED ART

It is known to adjust the focus of the optical system of a video camera or the like by detecting, through a video signal output from an image sensor, the sharpness of an object image formed on an image sensing plane and by driving the optical system in such a manner as to obtain a maximum degree of sharpness. The fundamental concept of this known method is as follows: The video signal is extracted by means of a band-pass filter (hereinafter abbreviated as BPF) or a differentiating circuit or the like. The intensity of the high-frequency component of the video signal extracted is used for evaluation of the sharpness of the image. The degrees of sharpness of two images differently formed by driving the optical system are compared with each other by comparing through the intensity of the high-frequency components. The optical system driving and shifting direction is determined according to the result of the comparison. The optical system is brought to a stop at a point where a maximum sharpness is obtained.

Generally, in taking the picture of an ordinary object, the evaluated sharpness value varies according to the delivery degree of the focusing lens of the optical system in a hill forming manner as shown in FIG. 1 of the accompanying drawings. A summit point A of the hill as shown in FIG. 1 represents an in-focus point. With the initial lens position assumed to be at a point B of FIG. 1, the lens position begins to climb the hill with the start of the focusing action according to this method. After the lens position passes the point A, it is confirmed that the summit of the hill is passed over. Upon confirmation of it, the lens position is brought back to the point A. Referring to FIG. 1, the image is in a greatly blurred state within areas "r" in general. In view of this, the optical system is preferably driven at a high speed within these areas. Within an area "p" near the in-focus point A, the optical system is preferably driven at a relatively low speed for the purpose of accurately bringing the lens to a stop without the fear of hunting. Within intermediate areas "q" located between the above-stated areas, the optical system is preferably driven at a medium speed in consideration of both the focusing speed and the accuracy of focus adjustment.

For determining these driving speeds, a method of using the level of focus evaluation value such as the amount of the high-frequency component as shown in FIG. 1 is undesirable, because: The hill-like shape and the value of the top of the hill of the curve of FIG. 1 vary with the luminance of the object. In a conceivable method, therefore, a plurality of BPFs FA, FB and FC which are of different band widths are provided as shown in FIG. 3(a); the outputs of these BPFs are compared with each other; and a driving speed is determined according to the result of comparison, as shown in FIG. 2. However, in a case where the object image formed by the optical system is away from the image sensing plane and is thus in an excessively blurred state, the video signal includes only a small amount of the high-frequency component. In such a case, only a low-frequency component is detected as indicated by a characteristic curve "a" in FIG. 3(b). Then, as indicated by a part FA in FIG. 3(a), the output of the BPF which has a lower passing band comes to increase alone. Under such a condition, the high-frequency side of the frequency component of the video signal comes to be included in the output of the BPF accordingly as the object image approaches to an in-focus state as indicated by the characteristic curves "b" and "c" of FIG. 3(b). As a result, the outputs of the BPFs which have medium and high passing bands also come to increase as indicated at parts FB and FC of FIG. 3(a). FIG. 2 shows the outputs of these BPFs in relation to the optical system driving speed.

More specifically, frequency characteristics which are as shown in FIG. 3(b) are detected according to the output levels of the BPFs FA, FB and FC. Then, the position of the photo-taking lens is determined to be in one of the areas "p", "q" and "r" on the hill-like characteristic curve of FIG. 1 according to the result of detection. Then, the lens driving speed is controlled by changing it to the low, medium or high speed according to the applicable area. The lens is thus driven at the high speed when it is in a position greatly away from the in-focus point in such a way as to shorten a period of time required before the in-focus point is attained. The lens driving speed is lowered accordingly as the lens comes closer to the in-focus point and is further lowered in the neighborhood of the in-focus point to prevent hunting and to avoid stopping the lens in a wrong position other than the in-focus point. Therefore, the method enables the focus adjusting device to speedily and very accurately adjust the focus of the lens.

However, the conventional device described above is incapable of stably performing the detecting and speed-controlling actions, because the value of high-frequency component and those of other frequency band components included in the video signal vary with the luminance and the pattern of the object image. In the case of some object, either the driving speed control (hereinafter referred to as a focusing speed) is inadequate, thus causing an excessively long period of time before the lens is brought into an in-focus position or the focusing accuracy degrades.

Further, the characteristics of changes taking place in the lens driving degree and the focusing degree also vary with the focal length and the aperture value of the optical system. This, aside from the conditions of the object, also has made it difficult to constantly ensure a stable focusing action.

SUMMARY OF THE INVENTION

It is a first object of this invention to solve the problems of the prior art mentioned in the foregoing.

It is a second object of the invention to provide an automatic focus adjusting device which is capable of stably performing focus adjustment without being affected by variations of the luminance and pattern of the photo-taking object.

It is a third object of the invention to provide an automatic focus adjusting device which is capable of stably and speedily performing focus adjustment by eliminating all focus adjusting speed variations that result from variations of the pattern, luminance, etc., of the photo-taking object.

It is a fourth object of the invention to provide an automatic focus adjustment device which is capable of meeting both requirements for a focusing speed and for focusing accuracy irrespectively of the condition and the kind of the object by obtaining the sharpness of the image thereof through the edge width value detected from the image and by varying an optical system driving speed according to the degree of sharpness thus obtained.

To attain this object, an automatic focus adjusting device arranged as a preferred embodiment of this invention comprises: image sensing means for obtaining a video signal by converting an object image formed on an image sensing plane by a photo-taking lens optical system; means for detecting a high-frequency component of the video signal; means for detecting the sharpness of the object image on the basis of the width of an edge part of the object image through the video signal; driving means for varying the position of the photo-taking lens optical system relative to the image sensing plane in the direction in which a detection output obtained by detecting the high-frequency component and a detection output obtained by detecting the sharpness increase; and control means for controlling the driving speed of the driving means according to the sharpness detection output.

It is a fifth object of the invention to provide an automatic focus adjusting device which is capable of adequately operating in terms of both a constant focusing speed and focusing accuracy without being affected by the aperture value and the focal length of an optical system by detecting the aperture value and the focal length of the optical system and by adjusting the setting value of a blur-width detecting circuit which is arranged to change an optical system driving speed according to the results of detection.

To attain that object, an automatic focus adjusting device arranged as another preferred embodiment of the invention comprises: image sensing means for obtaining a video signal by converting into the video signal an object image formed on an image sensing plane through a photo-taking lens optical system; means for detecting a high-frequency component of the video signal; means for detecting through the video signal the degree of sharpness of the object image on the basis of the width of an edge part of the object image; driving means for changing the position of the photo-taking lens optical system relative to the image sensing plane in the direction in which the output of the high-frequency component detecting means and that of the sharpness detecting means increase; and control means for controlling the driving speed of the driving means according to the degree of sharpness which is based on the width of the edge part, the control means being arranged to cause threshold values set for controlling the driving speed to be changed according to the depth of field of the photo-taking lens optical system.

It is a sixth object of the invention to provide an automatic focus adjusting device which is arranged to be capable of having a given constant focusing speed and a high degree of focusing accuracy irrespectively of the condition and the kind of a photo-taking object; to be capable of preventing the focusing accuracy from degrading and preventing any faulty action even in the event of the presence of an extraordinarily high-luminance object; and to be capable of obtaining the given constant speed and the high focusing accuracy irrespectively of the aperture and zooming conditions of an optical system by detecting the aperture value and the focal length of the optical system and by adjusting the setting value of a width-of-blur detection output according to which an optical system driving speed is changed.

It is a seventh object of the invention to provide an automatic focusing device which is arranged to detect, through a detection output obtained by detecting the edge width of a main photo-taking object image formed on the image sensing plane of an image sensor, the degree of blur of the image and to change an optical system driving speed according to the degree of blur and information on detection of the presence of a high-luminance object, so that both a focusing speed and a focusing accuracy can be adequately attained irrespectively of the condition and kind of the main object and particularly even in a case where a focusing characteristic changes due to the presence of a high-luminance object; and the device is arranged also to detect, in parallel to the above-stated actions, the aperture value and the focal length of the optical system and to adjust the setting value of a width-of-blur detection circuit which is arranged to change the optical system driving speed according to detection data thus obtained, so that the focusing action can be performed both at an adequate speed and at a high degree of accuracy without being affected by the aperture value and the focal length of the optical system.

To attain the seventh object, an automatic focus adjusting device arranged as a preferred embodiment of this invention comprises: image sensing means for obtaining a video signal by converting a photo-taking object image formed on an image sensing plane through a photo-taking lens optical system into the video signal; means for detecting a high-frequency component included in the video signal; first detection means for detecting the degree of sharpness of the object image from the video signal on the basis of the width of an edge part of the object image; second detection means for detecting a high-luminance part obtained on the image sensing plane; driving means for changing the position of the photo-taking lens optical system in the direction in which a detection output relative to the high-frequency component and a detection output relative to the degree of sharpness come to increase; and control means for controlling the driving speed of the driving means in accordance with the outputs of the first and second detection means.

It is an eighth object of the invention to provide an automatic focus adjusting device which is capable of having a given constant focusing speed and a high degree of focusing accuracy, irrespectively of the condition and the kind of the photo-taking object, and also is capable of preventing the focusing accuracy from degrading and preventing any faulty action even in the event of the presence of a high-luminance object and in the event of an extremely low-contrast object.

It is a ninth object of the invention to provide an automatic focus adjusting device which is arranged to control the driving speed of a focus adjusting system on the basis of a value obtained by adding together a detected value of the edge width of a photo-taking object image and that of a high-frequency component, so that a focus adjusting action can be accurately accomplished even for a high-luminance object or a low-contrast object irrespectively of the kind and the condition of the object. The device is also arranged to be capable of reliably lowering the driving speed in the neighborhood of an in-focus point, so that an automatic focus adjusting action can be speedily and accurately performed without requiring a long period of time and without causing any hunting nor any faulty action.

To attain the ninth object, an automatic focus adjusting device which is arranged as a preferred embodiment of this invention comprises: image sensing means for converting into a video signal a photo-taking object image formed through a photo-taking optical system; first detection means for detecting a high-frequency component included in the video signal; second detection means for detecting, from the video signal, information on the width of an edge part of the object image; first control means for setting the driving speed of a focus adjusting system which is arranged to vary the position of the optical system relative to an image sensing plane on the basis of the output of the second detection means; second control means for setting the driving speed of the focus adjusting system on the basis of changes taking place in a sum value obtained by adding together the outputs of the first and second detection means; and driving means for driving the focus adjusting system at the driving speeds set by the first and second control means.

The above and other objects and features of the invention will become apparent from the following detailed description of embodiments thereof taken in connection with the accompanying drawings.

BRIEF DESCRIPTION OF THE DRAWINGS

FIG. 2. shows normal focusing speed control actions.

FIGS. 10(a), 10(b) and 10(c) show a detecting action on a high-luminance object image.

DETAILED DESCRIPTION OF THE PREFERRED EMBODIMENT

Figure 4:
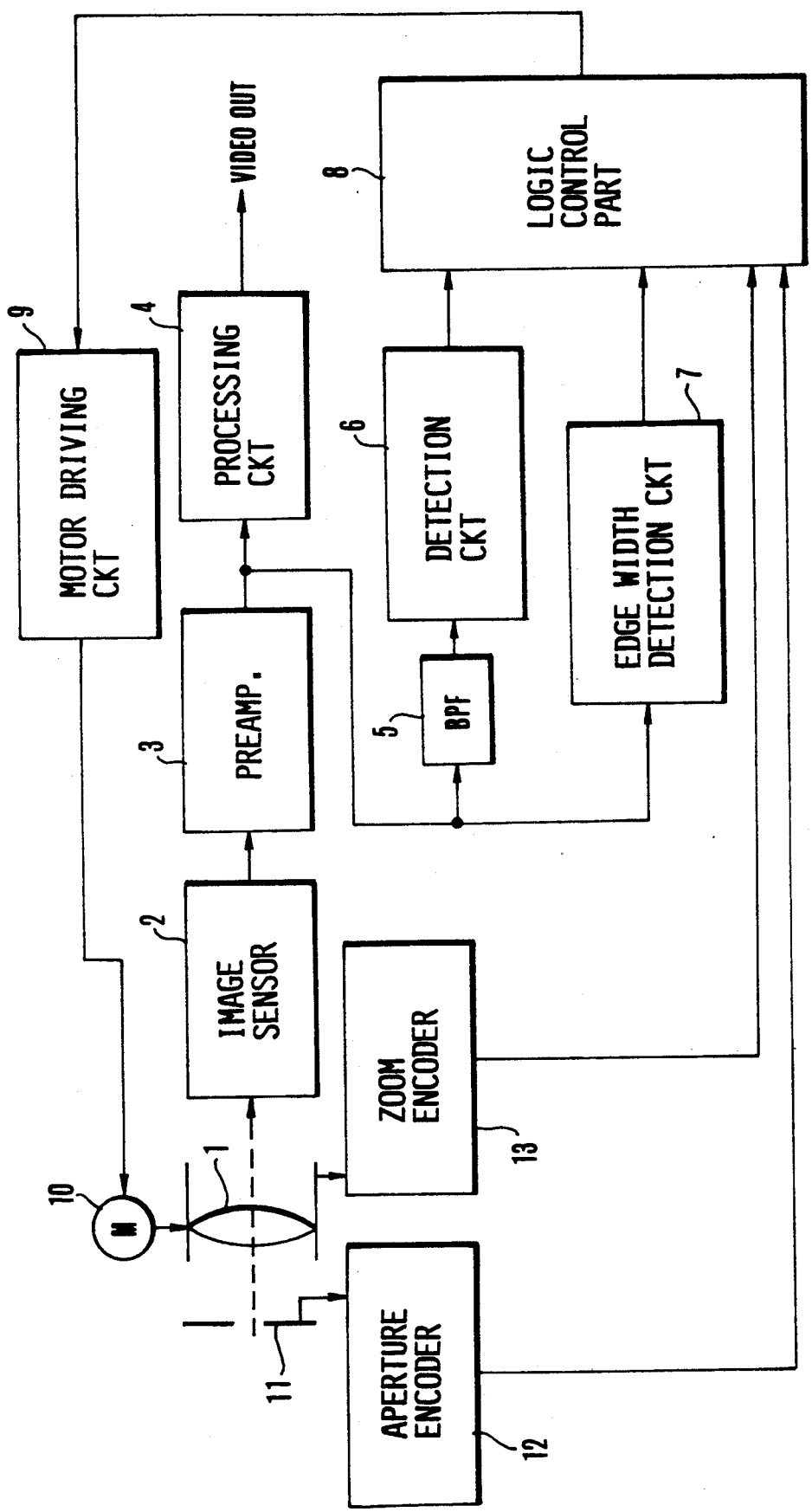
FIG. 4 is a block diagram showing an automatic focus adjusting device arranged as a first embodiment of this invention.

The following describes with reference to the accompanying drawings an automatic focus adjusting device which is arranged as a first embodiment of this invention:

Referring to FIG. 4, an optical system 1 includes a photo-taking lens. An image sensor 2 is a CCD or the like. A reference numeral 3 denotes a preamplifier. A processing circuit 4 is arranged to perform various processing actions including a gamma correction process, a blanking process, a synchronizing signal adding process, etc., on an image signal output from the preamplifier 3 and to produce a standardized TV signal. A BPF (band-pass filter) 5 is arranged to extract from the image signal output from the preamplifier a given high-frequency component which is to be used for focus detection. A detection circuit 6 is arranged to average the amount of the high-frequency component output from the BPF 5. An edge width detection circuit 7 is arranged to detect the degree of sharpness of an object image through the width of an edge part of the object image. The width of this edge part is called a blur width which indicates the degree of defocus. The blur width decreases accordingly as the lens position comes closer to an in-focus point and the image sharpness increases accordingly. In the case of this (first) embodiment, the degree of sharpness is defined as the reciprocal of the edge width. As will be further described later herein, the sharpness defined on the basis of the edge width is never affected by the pattern and the contrast of the object.

A logic control part 8 controls the whole device and is arranged to control the photo-taking lens shifting direction, a shifting speed and a shifting degree on the basis of the output of the edge width detection circuit 7. A motor driving circuit 9 is arranged to drive a photo-taking lens driving motor 10 according to a driving control signal output from the logic control part 8. A number 11 denotes an iris. An aperture encoder 12 is arranged to detect the aperture value of the iris 11. A zoom encoder 13 is arranged to detect the focal length of the zoom lens of the photo-taking lens optical system 1.

The above-stated circuit arrangement operates as follows: An object image formed on the image sensing plane of the image sensor 2 through the photo-taking lens optical system 1 is converted into an electrical signal by the image sensor 2 and is output as an image signal. The image signal is amplified to a suitable level by the preamplifier 3 and is then supplied to the processing circuit 4. The processing circuit 4 then converts the signal into a video signal conforming, for example, to the NTSC system or the like. Meanwhile, the image signal which is output from the preamplifier 3 but is not supplied to the processing circuit 4 for the gamma correction process, etc., is supplied to the BPF 5. The BPF 5 extracts a given high-frequency component from the image signal. The high-frequency component thus extracted is supplied to the detection circuit 6 to obtain the peak value or integrated value of it obtained either from the whole area of the image sensing plane or from within some limited part of the image sensing plane. The peak or integrated value thus obtained is supplied to the logic control part 8. The output (image signal) of the preamplifier 3 is also supplied to the edge width detection circuit 7. Upon receipt of the signal, the edge width detection circuit 7 computes the edge width of the object image obtained on the image sensing plane. The output of the circuit 7 is then supplied to the logic control part 8. The logic control part 8 obtains information on the degree of sharpness from the detection circuit 6 and the edge width detection circuit 7. The logic control part 8 then determines the optical system driving direction, stopping the driving action or restarting the driving action on the basis of changes temporally taking place in information on the degree of sharpness when the photo-taking lens optical system is driven according to the sharpness degree information obtained from the detection circuit 6 and the edge width detection circuit 7. Further, the optical system driving speed is determined according to the sharpness information obtained from the edge width detection circuit 7.

The logic control part 8 then controls and causes the motor driving circuit 9 to drive the optical system 1 in the direction in which the amount of the high-frequency component of the video signal comes to increase within the video signal. The optical system is thus driven into the in-focus position thereof.

Figure 6A:
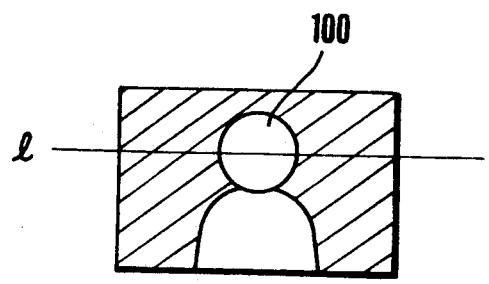
FIGS. 6(a) and 6(b) show the edge width detecting action of the first embodiment.
Figure 6B:
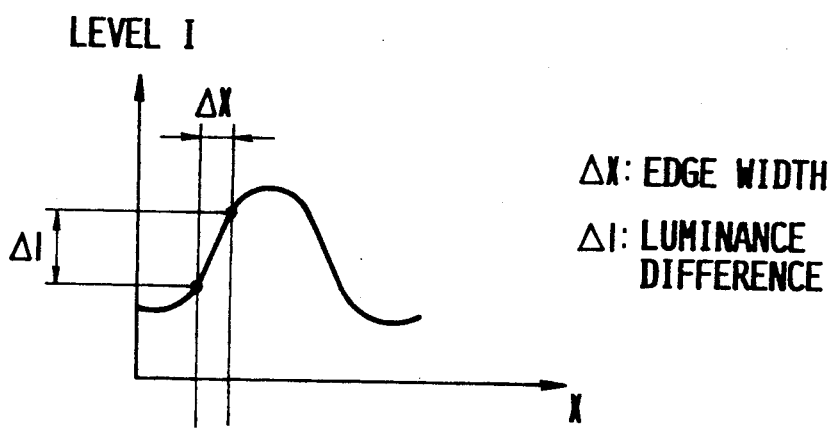

The details of the edge width detection circuit 7 are as follows: The edge width detection output of the circuit 7 indicates the sharpness degree of the object image and is unaffected by the contrast and luminance of the object and the pattern or shape of the object image. A practicable method for obtaining such an output has been disclosed, for example, in Japanese Laid-Open Patent Application No. SHO 62-103616. In accordance with this method, the sharpness degree of an object image is alone accurately evaluated by detecting the width of the edge part of the image irrespectively of the contrast, etc. of the object. The arrangement of the edge width detection circuit 7 is as described below with reference to FIGS. 6(a), 6(b) and 7:

FIG. 6(a) shows an image sensing plane on which a photo-taking object 100 is imaged. Variations in luminance of the video signal taking place, for example, on a straight line l can be illustrated as shown in FIG. 6(b). The axis of ordinate of FIG. 6(b) shows the levels of luminance while the axis of abscissa shows positions on the image sensing plane. Assuming that the lens is in focus on the object 100, the luminance level of the video signal part for the object 100 is high while the luminance level of the signal for a background part is low. The high-frequency component included in the luminance signal likewise has a high level for the object and a low level for the background. The state of the edge part of the object image is as follows: Assuming that the width of the edge part is $\Delta X$ and a difference in luminance corresponding to the edge width $\Delta X$ is $\Delta I$, the edge width $\Delta X$ decreases accordingly as the lens comes closer to the in-focus point and increases accordingly as the lens is more out of focus. A minimum value of the edge width is attained at the in-focus point. The edge width $\Delta X$ is determined by the diameter of circle of confusion, the resolving power of the image sensor and the bandwidth of the image signal processing system. However, the latter two have no relation to the in-focus or out-of-focus state of the optical system. The former, i.e. the diameter of circle of confusion, varies according to the in-focus or out-of-focus state of the optical system. The former is, however, not influenced by the condition and the luminance of the object. Hence, with the edge width $\Delta X$ detected, a discrimination between an in-focus state and an out-of-focus state can be accurately made by comparing the detected value of the edge width with a maximum diameter of circle of confusion.

Figure 7:
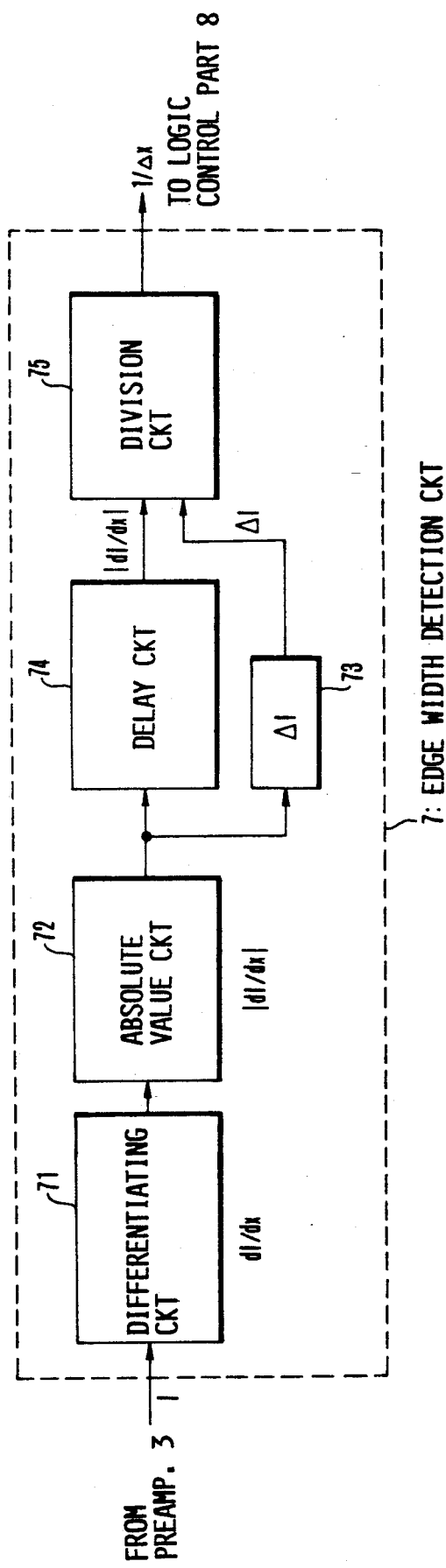
FIG. 7 is a block diagram showing the arrangement of an edge width detection circuit of the first embodiment.

FIG. 7 shows in a block diagram the internal arrangement of the edge width detection circuit 7. Referring to FIG. 7, a differentiating circuit 71 is arranged to obtain $dI/dx$ by differentiating the video signal output from the preamplifier 3. An absolute value circuit 72 is arranged to obtain the absolute value $|dI/dx|$ of the output of the circuit 71. A circuit 73 is arranged to obtain the luminance difference $\Delta I$ of the edge part. The luminance difference $\Delta I$ is obtainable by integrating $dI/dx$ within a minute interval in the direction of arrow X.

A delay circuit 74 is provided for adjustment of computation timing by delaying the absolute value output $|dI/dx|$ of the circuit 72 for a delay time determined according to the integrating action which is performed for obtaining the luminance difference $\Delta I$. A division circuit 75 is arranged to obtain the edge width $\Delta x$ in the form of a reciprocal by dividing the output $dI/dx$ of the delay circuit 74 by the output $\Delta I$ of the computing circuit 73 thus performing a division $(dI/dx) / \Delta I = 1/\Delta x$. As a result, the edge width detection circuit 7 produces the edge width $\Delta x$ in the form of a reciprocal. The output value of the circuit 7 increases accordingly as the lens comes closer to the in-focus point.

The logic control part 8 is arranged to perform a focus adjusting action by causing the photo-taking lens optical system 1 to be driven in the direction of increasing the output level of the detection circuit 6. The part 8 also controls the lens driving speed by controlling the motor driving circuit 9 on the basis of the value of sharpness $1/x$ obtained from the edge width detection circuit 7. In other words, referring to FIG. 5(a), the position of the lens is determined to be in the area "p" which is near the in-focus point or in the area "q" or "r" which is located on the outside of the area "p". The lens driving speed is changed to one of the low, medium and high speeds according to the applicable area. In this manner, the focus adjusting action can be accurately and speedily accomplished without being influenced by the pattern, the luminance, etc., of the object.

Figure 5A:
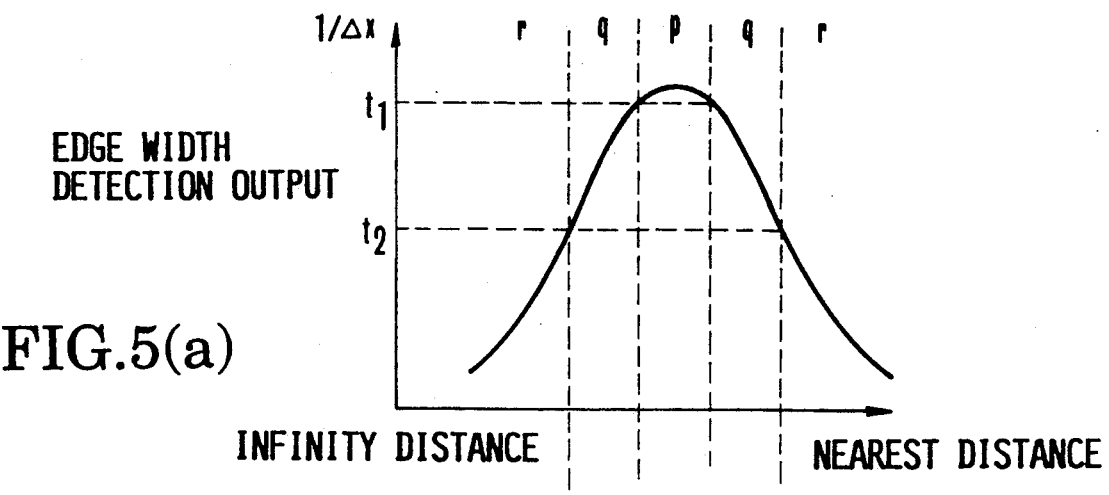
FIGS. 5(a), 5(b) and 5(c) show the characteristic of operation of the first embodiment.

Next, the lens driving speed is controlled according to the depth of field of the photo-taking lens optical system in the following manner: Generally, if the aperture value and the focal length are unvarying, the defocus degree, i.e., the degree of deviation from the in-focus point, of the lens of the optical system used for a video camera or the like is unconditionally determined by a blur width, i.e., the diameter of circle of confusion obtained on the image sensing plane. Therefore, as shown in FIG. 5(a), the position of the lens relative to the in-focus point is detected according to values t1 and t2 of the output of the edge width detection circuit 7 (the reciprocal number of the edge width) and the lens driving speed is adjusted according to the lens position detected. This method enables the lens driving speed control to be accomplished solely on the basis of the defocus degree of the distance ring of the lens without having recourse to the object. In FIG. 5(a), the edge width detection output is obtained as an evaluation value of sharpness of the object image. Therefore, the edge width detection output value in FIG. 5(a) is shown as increasing in the direction in which the edge width decreases, that is, the sharpness of the object image which is the reciprocal of the edge width increases.

Figure 5B:
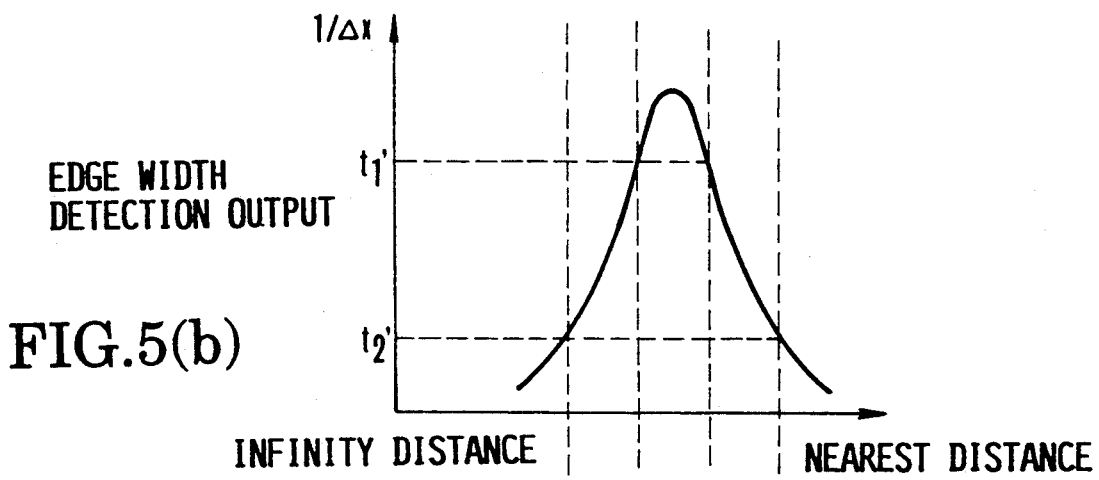
Figure 5C:
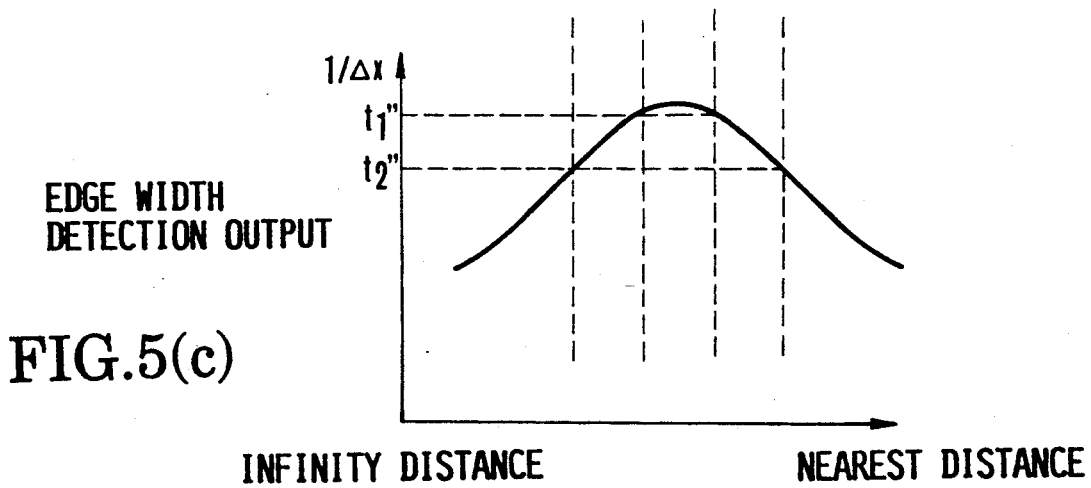

The above description is on the assumption that the aperture value and the focal length of the optical system are unvarying. In a case where the aperture value and the focal length, i.e., the depth of field, are varying, the curve which is in a hill-like shape representing the edge width detection output in FIG. 5(a) changes as shown in FIGS. 5(b) and 5(c). Generally, the optical system of a video camera is provided with an iris mechanism. Besides, the number of video cameras of the kind having the so-called zoom lens has recently increased. The optical system driving speed cannot be arranged to be in the same manner for all video cameras alike including the video cameras of this kind as the lens driving degree for a defocus degree varies according to the shape of the hill. Therefore, the setting values of threshold values used for change-over of the optical system driving speed according to the edge width detection output must be also changed according to the shape of the hill.

For example, if either the focal length becomes longer or the iris aperture is opened further from the focal length and the aperture value obtained in the case of the hill-like shape as shown in FIG. 5(a), the degree of focus (sharpness) changes to a greater degree in response to even a slight shift of the lens position and the hill shape becomes sharper and steeper as shown in FIG. 5(b). In this instance, the threshold values of the changing degree of the sharpness (edge width) in relation to the lens driving degree are changed to threshold values t1' and t2'. This keeps the motor driving speed unvarying for each of the area "p" near the in-focus point, the area "q" which is on the outside of the area "p" and the area "r" which is on the outside of the area "q" irrespectively of the change of the depth of field.

In the event of a deeper depth of field with the focal length becoming shorter or with the iris aperture stopped down, the hill-like shape of the curve becomes moderate as shown in FIG. 5(c). Then, the sharpness (or edge width) changes to a less degree in relation to the lens driving degree. In that instance, the threshold values of the sharpness are changed to values t1" and t2" to ensure that the motor driving speed, i.e., the lens driving speed, is accurately changed from one speed over to another for each of the focusing areas "p", "q" and "r".

Again referring to FIG. 4, the aperture encoder 12 is arranged to detect the aperture value of the photo-taking lens optical system 1 while the zoom encoder 13 is arranged to detect the focal length of the optical system. Information on these values thus detected is supplied to the logic control part 8. At the control part 8, a computing operation is performed according to the information to find which of the characteristic curves representing the lens shifting degree and the sharpness in FIGS. 5(a), 5(b) and 5(c) is applicable. After that, in accordance with the result of the computation, the sharpness threshold values are obtained for changing the lens driving speed to the high, medium or low speed. The speed of the lens driving motor is controlled by using these threshold values.

As described above, the logic control part 8 is arranged to determine the optical system (lens) driving direction, stopping the lens driving action, restarting the driving action and the speed of it. Information on the result of determination is supplied to the motor driving circuit 9. The motor driving circuit 9 drives the lens driving motor 10 in accordance with the information.

The first embodiment described above is arranged to perform lens control in three different manners for three different conditions as represented by the three curves shown in FIGS. 5(a), 5(b) and 5(c). However, the control is not limited to the three manners. The control can be performed more accurately by more finely dividing the manner of lens control.

While the lens driving speed is arranged to be changable in three steps including the low, medium and high speeds for the areas "p", "g" and "r". The number of the changeable steps is also not limited to three steps. The number of changeable steps can be easily increased.

As described in the foregoing, the sharpness of the object image is obtained from a detected value of the edge width of the image. The degree of blur of the object image formed on the image sensing plane of the image sensor is thus obtained. The optical system driving speed is varied according to the degree of blur. The automatic focusing action performed in this manner satisfies both of the requirements for the focusing speed and for the focusing accuracy irrespectively of the condition and the kind of the object.

Further, the first embodiment is arranged to detect the aperture value and the focal length of the optical system; and to change, according to this information, the setting value of the blur (edge) width detection circuit which adjusts the optical system driving speed. By virtue of this arrangement, the automatic focusing action is adequately performed to satisfy both of the requirements for the focusing speed and for the focusing accuracy irrespectively of the aperture value and the focal length of the optical system.

Figure 8:
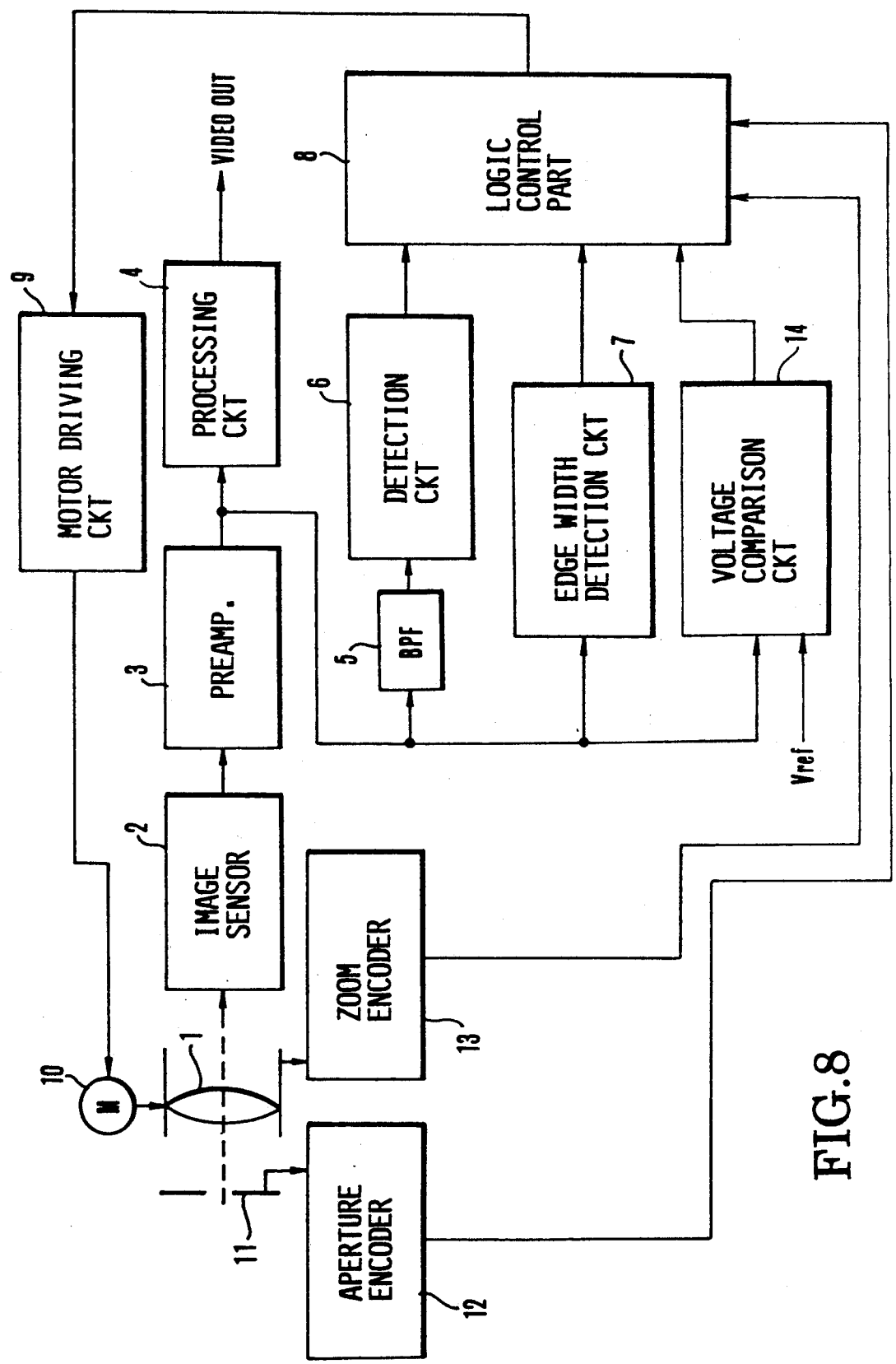
FIG. 8 is a block diagram showing an automatic focus adjusting device arranged as a second embodiment of the invention.

Next, an automatic focus adjusting device which is arranged according to this invention as a second embodiment thereof is described below with reference to FIGS. 8 to 10:

The second embodiment is arranged to be capable of carrying out a stable focus adjusting action without being affected by the luminance, pattern, etc., of an object image formed on an image sensing plane. In FIG. 8, the same component parts as those of the first embodiment shown in FIG. 4 are indicated by the same reference numerals and the details of them are omitted from description. Referring to FIG. 8, a video signal which is output from a preamplifier 3 is supplied to a voltage comparison circuit 14. The circuit 14 is arranged to compare the voltage of the video signal with a preset reference voltage level Vref and to produce a low level signal when the voltage level of the video signal is lower than the reference level Vref and a high level signal when the former is higher than the latter. A part of the image for which the signal level is found to be higher than the reference level Vref is judged to represent a highluminance object, as will be described in detail later.

A logic control part 15 controls the whole device. The control part 15 is arranged to control the direction, speed and degree of a photo-taking lens optical system shifting action by causing a motor driving circuit 9 to drive a photo-taking lens driving motor 10 on the basis of the output of a detection circuit 6 and that of an edge width detection circuit 7.

Like in the case of the first embodiment shown in FIG. 4, the image (video) signal output from an image sensor 2 is supplied also to a processing circuit 4 via the preamplifier 3. At the processing circuit 4, the signal is converted into a standardized video signal. Meanwhile, a given high-frequency component is alone extracted by a band-pass filter (BPF) 5 from the image signal which is not subjected to the gamma correction, etc.. The high-frequency component thus obtained is supplied to the detection circuit 6. At the circuit 6, the peak value or an integrated value of the high-frequency component which is obtained either from the whole area of or from a limited area of the image sensing plane is obtained and supplied to the logic control part 15. The output of the preamplifier 3 is supplied also to the edge width detection circuit 7. The circuit 7 computes the edge width of the object image formed on the image sensing plane of the image sensor 2. Information on the computed edge width is supplied to the control part 15. At the control part 15, the direction in which the optical system 1 is to be driven, stopping the driving action, restarting the driving action, etc. are determined on the basis of a temporal change taking place in sharpness information when the photo-taking lens optical system 1 is driven according to the sharpness information obtained from the detection circuit 6 and the edge width detection circuit 7. The part 15 also determines the optical system driving speed according to the sharpness information obtained from the edge width detection circuit 7.

The logic control part 15 controls and causes the motor driving circuit 9 to drive the photo-taking lens optical system 1 in the direction in which the output level of the detection circuit 6, i.e., the amount of the high-frequency component of the video signal comes to increase.

Figure 1:
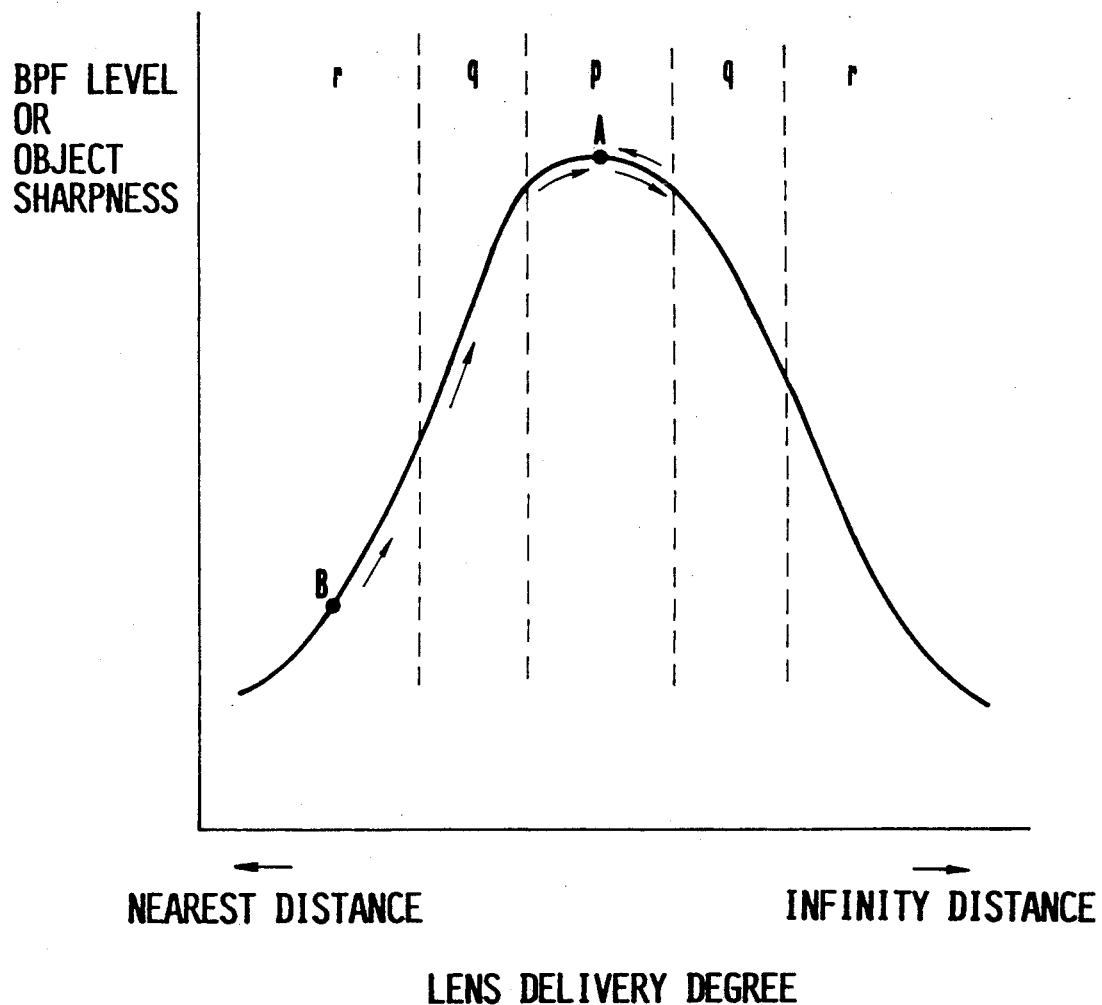
FIG. 1 is a graph showing the general characteristic of a focusing operation.
Figure 3A:
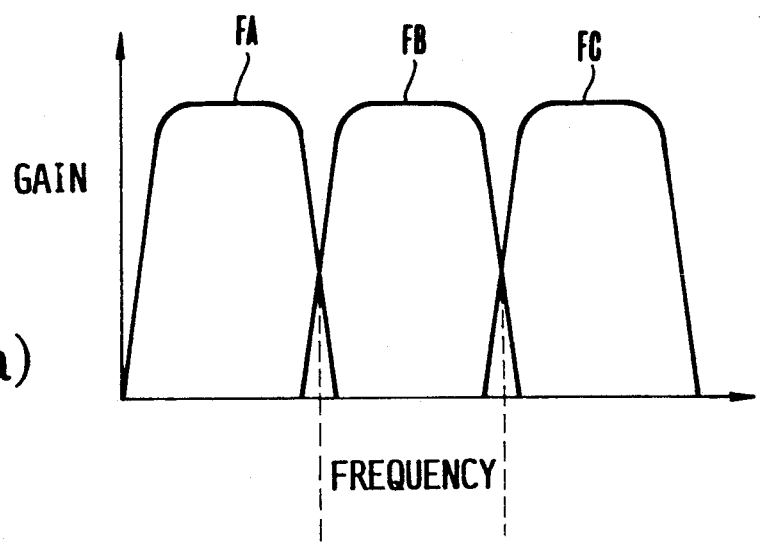
FIGS. 3(a) and 3(b) show the characteristics of filters used for detecting a focus signal in relation to their outputs.
Figure 3B:
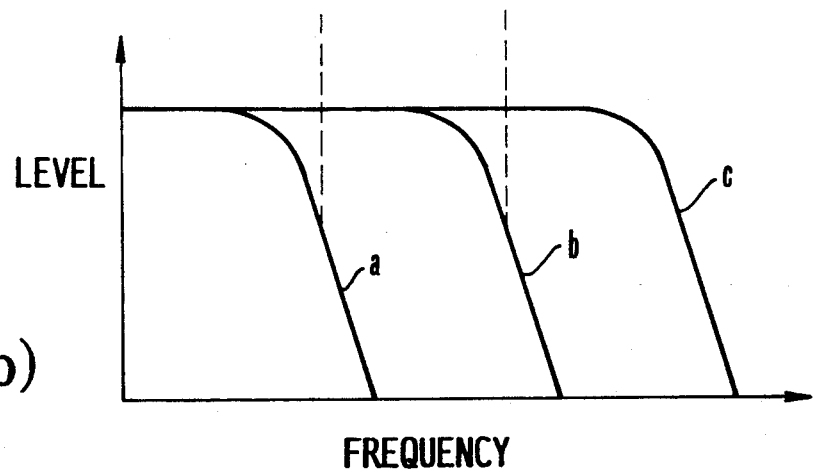

The arrangement and the operation of the edge width detection circuit 7 are the same as the description given in the foregoing with reference to FIGS. 3 and 4.

The logic control part 15 is arranged to perform a focus adjusting action by causing the photo-taking lens optical system 1 to be driven in the direction in which the output level of the detection circuit 6 increases. In addition to this, the control part 15 also controls the lens driving speed by controlling the motor driving circuit 9 on the basis of the image sharpness value $1/\Delta x$ obtained from the edge width detection circuit 7. In other words, referring to FIG. 9(a), the lens position is determined as to whether it is in an area "p" which is near an in-focus point or in an area "q" or "r" which is on the outside of the area "p". Then, the lens driving speed is changed to a low, medium or high speed according to the area which corresponds to the lens position.

This enables the focus adjusting action to be speedily and accurately carried out.

Figure 9A:
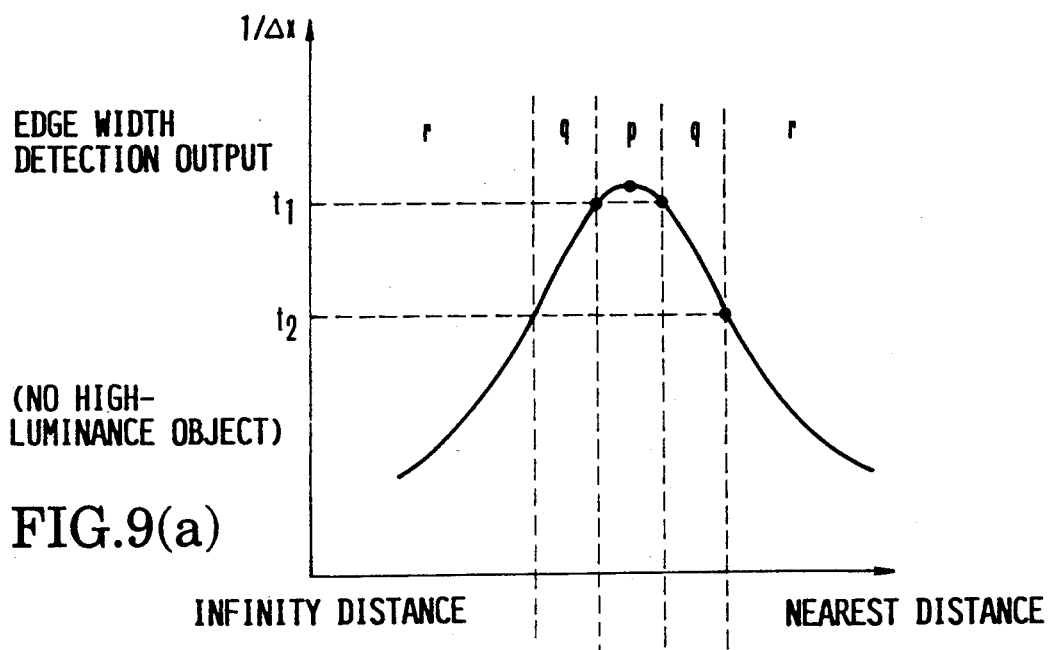
FIGS. 9(a) and 9(b) show through characteristic curves the optical system driving control action of the second embodiment performed for a high-luminance object.
Figure 9B:
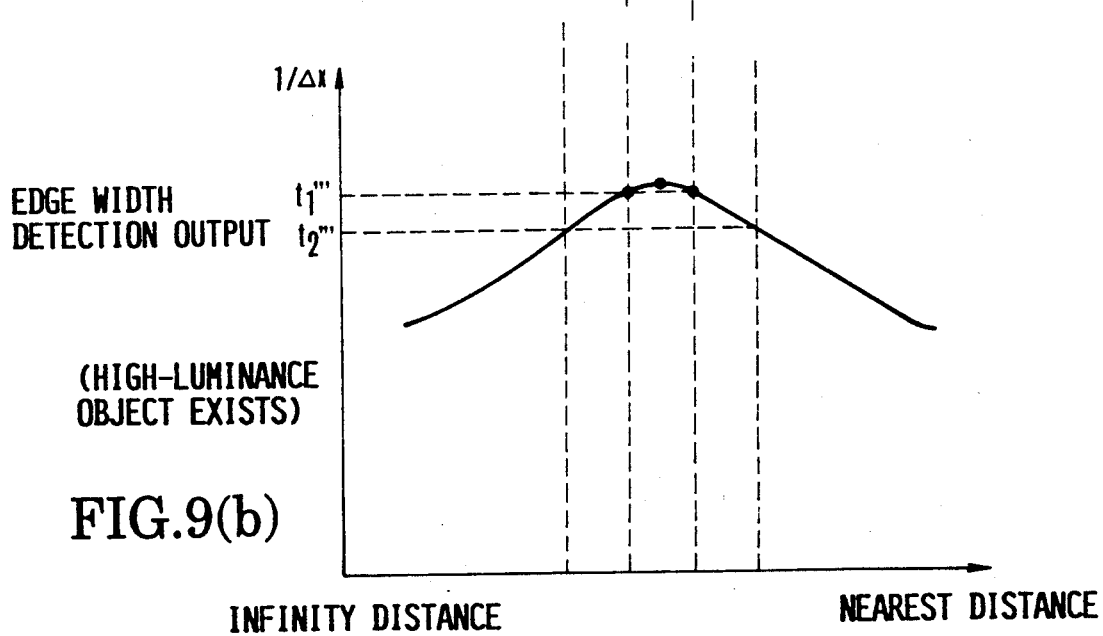

Next, a high-luminance detecting action is described as follows: Referring to FIG. 8, the video (or image) signal output from the preamplifier 3 is supplied to the voltage comparison circuit 14 to be compared with the reference voltage Vref as mentioned in the foregoing. FIGS. 10(a), 10(b) and 10(c) jointly show the high-luminance detecting action. In the case of FIG. 10(a), there is a high-luminance object A such as a light source besides a main photo-taking object. In such a case, the output of the edge width detection circuit 7 can be expressed with a moderate hill-like curve as shown in FIG. 9(b).

In other words, the signal level of a part which corresponds to a line B of FIG. 10(a) within the video signal output from the image sensor 2 is in a wave form as shown in FIG. 10(b). The signal level increases for a high-luminance part of the image sensing plane. However, for a such an extremely high-luminance part as a part A having a light source or the like, the signal level comes to exceed the capacity of electric charge stored at the image sensor 2 and thus results in a so-called saturated state as indicated at a part C in FIG. 10(b). The wave form is then in a shape having its upper part clipped off. The wave form also would take a shape similar to this even in the event of a blurred object image if the object has a sufficiently high degree of luminance. Any wave form that is clipped in this manner indicates a signal having a high-frequency component. Then, the output of the edge width detection circuit 7 remains at high levels over the whole lens shifting range and the rising height of the wave form decreases. In the event of high-luminance photo-taking object, therefore, the characteristic curve comes to show a moderate hill-like shape.

As shown in FIG. 10(c), the output of the voltage comparison circuit 14 takes a pulse signal wave form in which only a signal level part exceeding the reference voltage level Vref shows a high level. The reference voltage level Vref is set at a voltage obtained immediately before the video signal comes to saturate as shown in FIG. 10(b). With the reference voltage level set in this manner, the output of the voltage comparison circuit 14 comes to show a high level only in the event of the presence of a high-luminance object as shown in FIG. 10(c).

The logic control part 15 makes a discrimination between the presence and absence of a high-luminance object on the basis of the above-stated high-luminance information. In the event of the presence of a high-luminance object, the focusing control characteristic curve shows a hill-like shape as shown in FIG. 9(b) which is gentler than the hill shape of the normal focusing characteristic curve shown in FIG. 9(a). In that event, therefore, the setting values of the edge width detection output provided for change-over of the optical system driving speed are changed from the values t1 and t2 to values t1''' and t2''' which are suited for a gentler hill-like curve as shown in FIG. 9(b). With the optical system driving speed changed according to such setting values, the focus adjusting action can be accomplished with the motor speed reliably changed for each focusing area relative to the in-focus point even in the event of the presence of a high-luminance object in the same manner as in the case of a normal object as shown in FIG. 9(a).

With the optical system driving speed selected by the control part 15 according to the setting values of the blur width detection output which are determined in the above-stated manner, information on this is supplied to the motor driving circuit 9. The circuit 9 supplies a current to the motor 10 according to this information to cause the optical system 1 to be driven at the selected speed.

In the case of this (second) embodiment also, the lens driving speed is controlled according to the depth of field of the photo-taking lens optical system, because the focusing characteristic varies with the depth of field. The driving speed control according to the depth of field is performed simultaneously with the driving speed control according to the presence or absence of a high-luminance object mentioned in the foregoing. However, these control actions are described separately for the sake of expediency.

The optical system used for a video camera or the like is arranged as follows: Generally, if the aperture value and the focal length of the optical system are unvarying, the defocus degree, i.e., the degree of deviation from an in-focus point as appeared on the distance ring, is unconditionally determined by the width of blur obtained on the image sensing plane, i.e., by the diameter of circle of confusion. This has been already described in the foregoing description of the first embodiment with reference to FIG. 2. Therefore, the following briefly describes it:

Referring again to FIG. 2, the curve of the edge-width detection output which is as shown in FIG. 5(a) changes to a shape as shown in FIG. 5(b) or 5(c) when the aperture value or the focal length, i.e., the depth of field, of the optical system changes. If the optical system driving speed is changed always in the same manner, the lens driving degree required for the same degree of defocus varies with the hill-like shape of the curve. Therefore, the threshold values set according to the edge width detection output for the change-over of the lens driving speed are changed also according to the shape of the hill-like curve.

More specifically, the shape of the hill which is as shown in FIG. 5(a) becomes steeper as shown in FIG. 5(b) when the change of the focusing degree (the degree of sharpness) in response to the lens shifting action increases with the depth of field becoming shallower. In this instance, the threshold values of the changing degree of the sharpness (the reciprocal of the edge width) for the lens driving degree are changed to the values t1' and t2'. This arrangement ensures that the motor driving speed for each of the area "p" near the in-focus point, the area "q" which is on the outside of the area "p" and the area "r" which is on the outside of the area "q" can be kept unvarying irrespectively of the depth of field.

In a case where the depth of field becomes deeper, the curve comes to present a gentler hill-like shape as shown in FIG. 5(c). Then, the sharpness degree (edge width) changes to a less degree in relation to the lens driving degree. In that instance, the threshold values of the sharpness are changed to values t1" and t2". This ensures that the change-over of the motor driving speed, i.e., the lens driving speed, is adequately effected for the areas "p", "q" and "r" set relative to the in-focus point.

Again referring to FIG. 8, the aperture value of the photo-taking lens optical system 1 is detected by means of an aperture encoder 12. The focal length of the optical system is detected by a zoom encoder 13. Information (or data) thus obtained as the results of detection is supplied to the logic control part 15. The control part 15 then performs a computing operation on these data to obtain a characteristic curve which represents changes taking place in the relation between the lens shifting degree and the degree of sharpness (edge width). The control part 15 then finds which of the hill shapes shown in FIG. 5(a), 5(b) and 5(c) applies to the curve. Then, the threshold values of sharpness required for change-over of the lens driving speed are obtained according to the result of computation. The speed of a lens driving motor is controlled accordingly.

As described above, the logic control part 15 determines the lens driving direction, stopping or restarting of the lens driving action and the lens driving speed. The result of determination is supplied to the motor driving circuit 9. The motor driving circuit 9 then drives the lens driving motor 10 accordingly.

Further, in accordance with this invention, the kind of the characteristic curves does not have to be divided into three kinds. It can be more finely divided for more accurate lens control.

The lens driving speed is arranged to be changed by three steps including low, medium and high speeds for the areas "p", "q" and "r" respectively. However, the number of change-over steps is not limited to three and may be increased as necessary.

In cases where a high-luminance object exists within the image sensing plane, this embodiment is arranged to change the setting values of the edge width detection outputs which are used as the threshold values for changing the optical system (or lens) driving speed. However, the optical system driving speed control according to the invention is not limited to this method. For example, instead of changing the threshold values t1 and t2 as shown in FIGS. 9(a), 9(b), 5(a), 5(b) and 5(c), the speed of the motor itself may be changed. Further, it is also possible, in some cases, to change the setting values of the threshold values as well as the motor speed.

As described in the foregoing, the blurred degree of the object image on the image sensing plane of the image sensor is obtained through the sharpness which is obtained from the detected edge width of the object image. The optical system driving speed is arranged to be changed according to detection information about the presence of a high-luminance object as well as the blurred degree detected. This arrangement enables the embodiment to perform an automatic focusing action which satisfies both the required focusing speed and the required degree of focusing accuracy, irrespectively of the condition and the kind of the object and even in cases where the focusing control characteristic is changed due to the presence of a high-luminance object.

The embodiment is further arranged to detect, on the other hand, the aperture value and the focal length of the optical system and to change the setting value of a blur-width (edge width) detection circuit which changes the optical system driving speed according to information on the results of detection thus obtained. This arrangement also enables the embodiment to perform the automatic focusing action both at an adequate focusing speed and with an adequate degree of focusing accuracy without being affected by the changes of the aperture value and the focal length of the optical system.

A third embodiment of the invention is described below with reference to FIGS. 11 to 15:

In this case, a device of the kind performing focus adjustment according to information on the high-frequency component of a video signal and on the width of the edge part of an object image is arranged to be capable of performing the focus adjustment with a higher degree of accuracy by using means for setting the lens driving speed on the basis of the edge information together with means for setting the lens driving speed according to the sum of the value of the high-frequency component and that of the edge information.

Figure 11:
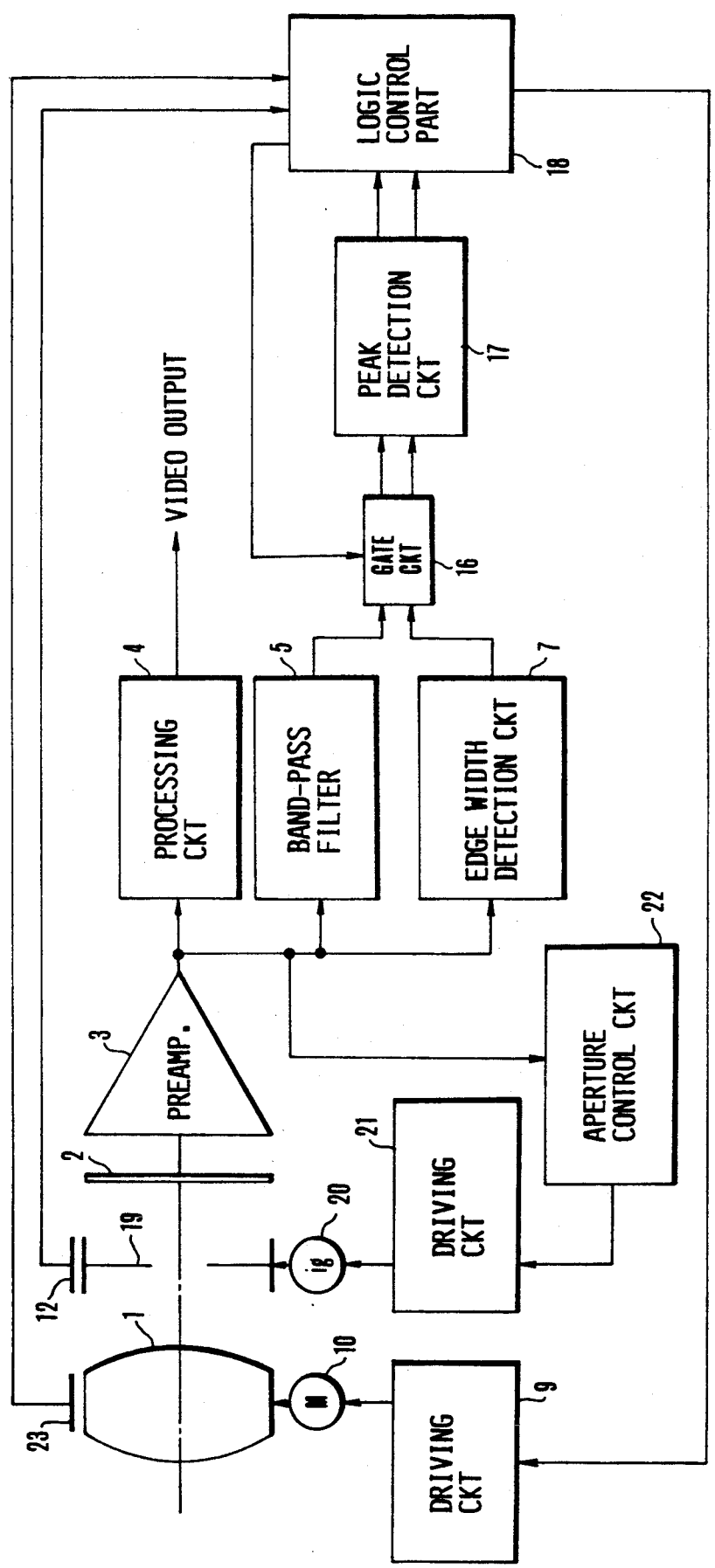
FIG. 11 is a block diagram showing an automatic focus adjusting device arranged as a third embodiment of the invention.

FIG. 11 shows in a block diagram the arrangement of an automatic focus adjusting device which is arranged according to this invention as the third embodiment thereof. In FIG. 11, the same component parts as those of FIGS. 4 and 8 described in the foregoing are indicated by the same reference numerals and the details of them are omitted from the following description. Referring to FIG. 11, a focusing lens group 1 is provided for focus adjustment. An iris 19 is arranged to control the quantity of light incident on an image sensor 2. The image sensor 2 is followed by a preamplifier 4. A processing circuit 4 is arranged to convert an image signal output from the image sensor 2 into a standardized TV signal and to supply the TV signal to a monitor, an electronic viewfinder or the like which are not shown. A BPF (band-pass filter) 5 is arranged to extract a high-frequency component of a given band from the image signal. An edge width detection circuit 7 is arranged to detect the sharpness of an object image through the width of the edge part of the image. The arrangement and the operation of the third embodiment are the same as those of the preceding embodiments.

A gate circuit 16 is arranged to extract only a signal portion corresponding to the inside area of a so-called distance measurement frame set on the image sensing plane of the image sensor 2 as a focus detecting area.

For this purpose, the gate circuit 16 turns on and off the passage of signals output from the BPF 5 and the edge width detection circuit 7 under the control of a logic control part 18. In other words, the gate circuit 16 is arranged to set a distance measurement area in a given part of the image sensing plane of the image sensor on the basis of vertical and horizontal sync signals and to allow only the image signal part obtained from within this area to pass there through. A peak detection circuit 17 is arranged to obtain either the peak value or the integrated value of, for example, one field period amount of the high-frequency component of the video (image) signal output from the BPF 5 and the signal which relates to the edge width and is output from the edge-width detection circuit 7. Information on the peak value or the integrated value thus obtained is supplied from the peak detection circuit 17 to the logic control part 18.

A motor 10 is arranged to drive the focusing lens group 1. A driving circuit 9 is arranged to drive the motor 10 according to an instruction from the control part 18. An IG meter 20 is arranged to vary the aperture of the iris 19. A driving circuit 21 is arranged to drive the IG meter 20. An aperture control circuit 22 is arranged to detect the average level of the signal output from the preamplifier 3 and to control the aperture position of the iris 19 by controlling the driving circuit 21 in such a way as to keep this signal level unvarying. The aperture control circuit 22 thus forms an aperture control feedback loop.

A focusing lens encoder 23 is arranged to detect the position of the focusing lens group 1. An aperture encoder 19 is arranged to detect the aperture value of the iris 19. The data thus obtained is supplied to the logic control part 18.

The logic control part 18 is arranged to perform overall control over the actions of the component blocks of the device including the automatic focus adjusting action. The control part 18 receives the peak value of the high-frequency component output from the peak detection circuit 17 and the peak value of the signal which corresponds to the edge width of the image and is output from the edge width detection circuit 7, and also receives the information on the values detected by the focusing lens encoder 23 and the aperture encoder 12. Then, in accordance with a control algorithm which will be described later, the control part 18 controls the driving circuit 9 of the motor 10 for driving the focusing lens group 1. Under this control, the lens group 1 is driven toward an in-focus point with the driving speed, the driving direction and stopping and restarting the motor determined by the control part 18. In other words, the logic control part 18 is a system control circuit which is formed with, for example, a microcomputer.

The edge width detection circuit 7 is arranged in the same manner as in the cases of the first and second embodiments described in the foregoing. The information on the edge width obtained by this circuit 7 is little affected by the contrast, etc. of the object image. The focusing lens driving speed, therefore, can be controlled in principle by using the value of edge width detected by the detection circuit 7 as it is.

Figure 12:
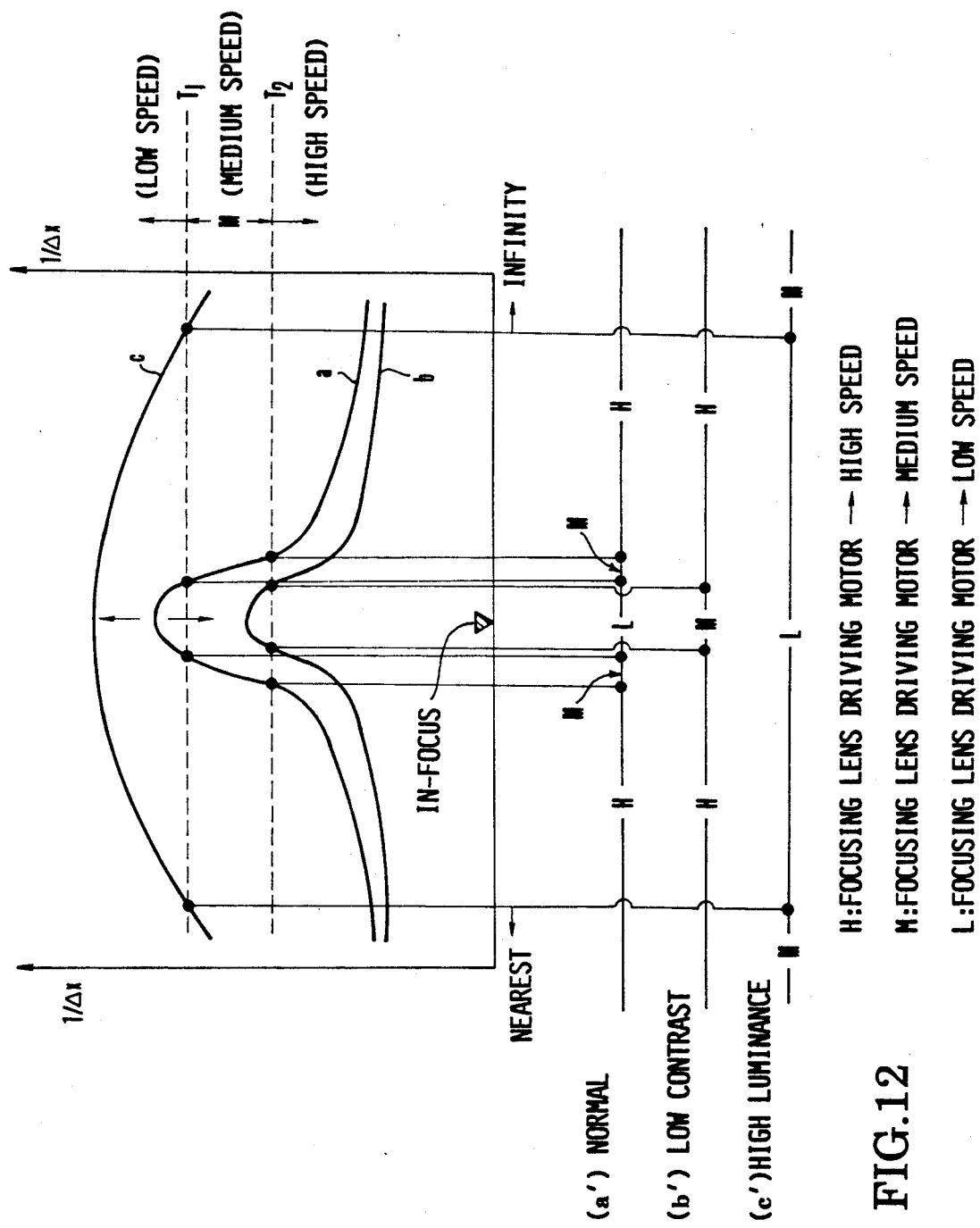
FIG. 12 shows the operation of an edge width detection circuit of the third embodiment through the relation of an edge width detection value to the position of a focusing lens.

However, it has been discovered that the method of using the detected value of the edge width sometimes fails to give an adequate characteristic under some extremely unfavorable conditions. This discovery indicates room for improvement in the method. The details of this are as described below with reference to FIG. 12 which shows the variations of the edge width detection value taking place when the position of the focusing lens group 1 is shifted from a nearest distance position to an infinity distance position:

In FIG. 12, a characteristic curve "a" shows a characteristic obtained under a normal condition. In this instance, the edge width detection output reaches a maximum value when the focusing lens group 1 comes near to an in-focus point. The edge width detection output value decreases accordingly as the lens group 1 moves away from the in-focus point. To determine the focusing position of the lens group 1, on the basis of the edge width detection output, as to whether it is located in an area near the in-focus point, in an area greatly away from the in-focus point or in an intermediate area, threshold values T1 and T2 are set for the edge width detection output $1/\Delta x$. The area in which the lens position is located relative to the in-focus point is determined by comparing the edge width detection output with the threshold values. Then, the speed of the focusing lens group driving motor 10 is adjusted to a low speed L for the area where the output and the threshold values are in a relation of $1/\Delta x \geq T1$, to a medium speed M for the area where the relation is $T1 > 1/\Delta x > T2$ and to a high speed H for the area where the relation is $T2 > 1/\Delta x$.

With the device arranged in this manner, the focusing lens can be driven in an optimum manner according to the focused degree as viewed on the normal characteristic curve "a". In other words, the lens group 1 is driven at the low speed near the in-focus point, at a high speed when it is in a great blur area and at the medium speed when it is in an intermediate area.

However, while the edge width itself is not affected by the contrast, the edge width detection value is sometimes brought into an error by the characteristic or the condition of the circuit of the signal processing system. When the contrast obtained within the image sensing plane comes to drop to a great degree, the S/N ratio, the linearity, etc. of the whole circuit arrangement including other circuit elements tend to lower both the accuracy and the sensitivity for the edge part of the signal. Under such a condition, therefore, it is impossible to obtain the characteristic showing a steep-hill-shaped curve steeply rising near the in-focus point, and the characteristic comes to be expressed by a low-hill-shaped curve "b".

In the event of a high-luminance object, the electric charge accumulated at the image sensor comes to saturate, exceeding the capacity of the image sensor. The video (image) signal level then rises to show a clipped waveform by saturating a camera signal processing circuit. However, while the difference between the high and low points of the hill-like curve decreases with the object image blurred, the level of the edge width detection value as a whole becomes high as represented by a curve "c" in FIG. 12.

With the characteristic curve varying in this manner, there is the possibility that accurate lens driving speed control becomes impossible due to changes in the actual speed setting areas relative to the threshold values T1 and T2 set for change-over of the lens driving speed according to the normal characteristic curve "a". More specific description of this problem is as follows: In a case where the focused degree and the edge width detection output are in a relation as represented by the characteristic curve "b" of FIG. 12, the top of the hill remains below the threshold value T1 which is set for change-over from a medium speed mode to a low speed mode. In this instance, the focusing lens driving speed fails to be lowered in the neighborhood of the in-focus point and thus tends to cause overshooting or hunting. Further, while the lens is in the area for the medium speed, a drop in the level of the edge width detection output brings about a high speed lens driving mode to degrade the focusing accuracy as a whole.

If the relation between the focused degree and the edge width detection output becomes as represented by the characteristic curve "c", the level of the edge width detection output becomes high as a whole. This broadens the area above the threshold value T1. Then, the focusing lens driving speed becomes too low while the lens position is far away from the in-focus point. As a result, an excessively long period of time is required for focusing action. Parts (a″), (b″) and (c″) of FIG. 12 more clearly show these relations in a patternized form.

Figure 14:
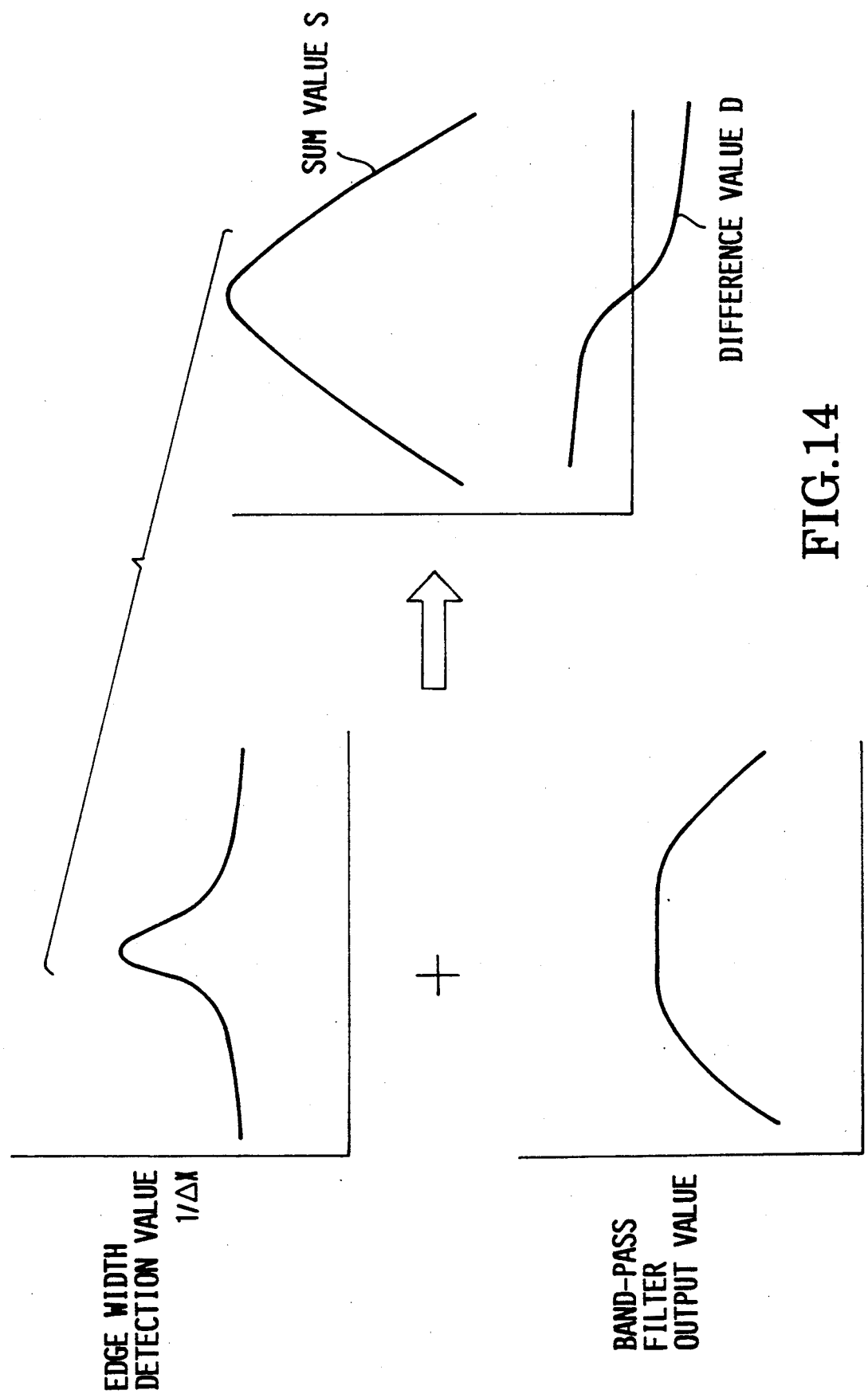
FIG. 14 also shows the control operation on the focusing lens driving motor.
Figure 15:
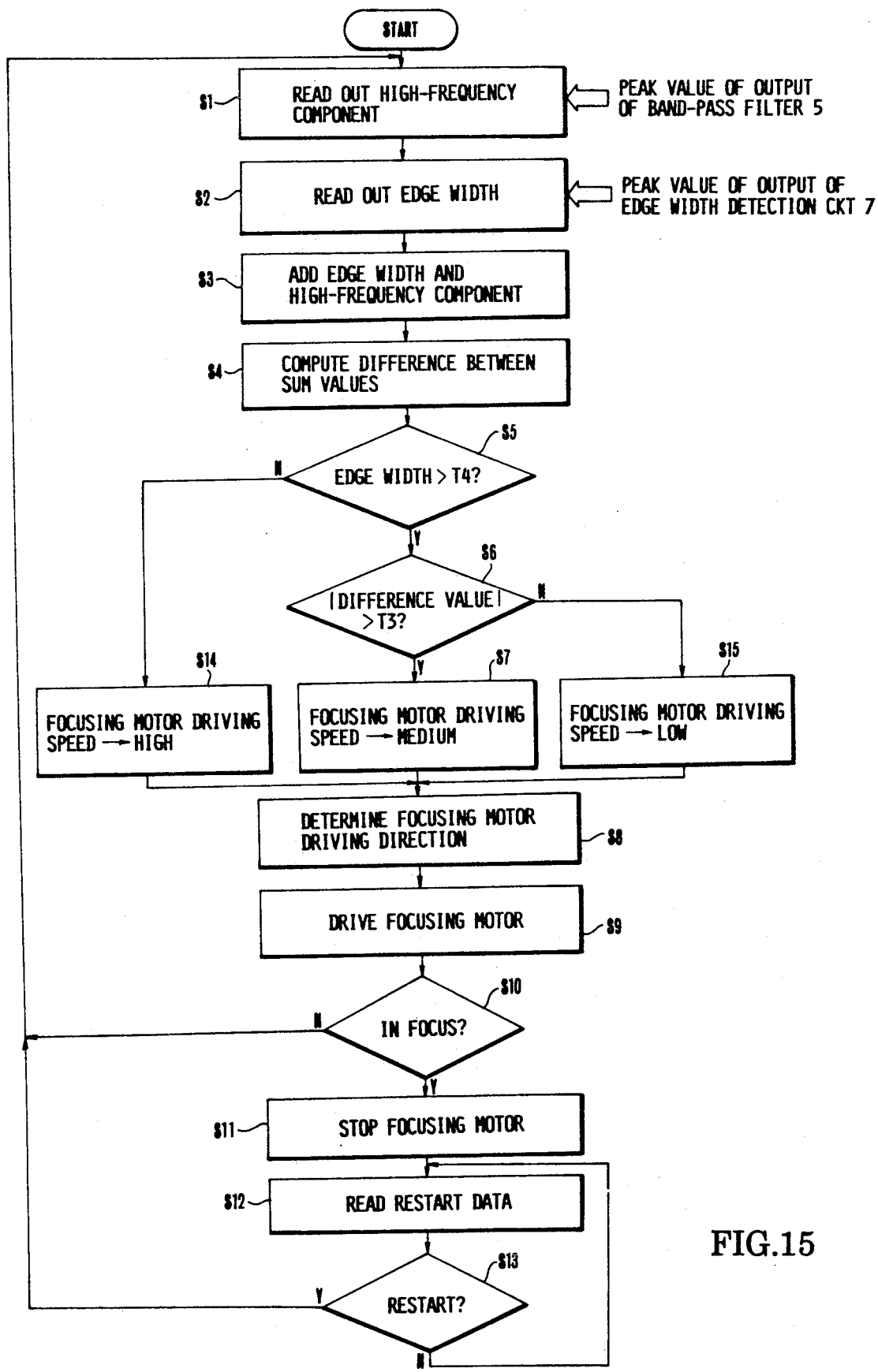
FIG. 15 is a flow chart showing the focus adjusting operation of the third embodiment.

To solve this problem, this (third) embodiment is arranged to obtain a curve S, as shown in FIG. 14, by adding together the edge width detection output output from the edge width detection circuit 7 and the high-frequency component value output from the BPF (band-pass filter) 5. The sum value thus detected for the current field is compared with the sum value detected for a preceding field to obtain a difference value D. The characteristic curve of this difference value D becomes zero at the in-focus point. The polarity of the value D before the in-focus point becomes inverse after this point. This method enables the device to detect the in-focus point where the sum value reaches a maximum value.

In other words, the third embodiment is based on the following concept: The above-stated difference value is not readily affected by the variations of the edge width detection value due to the causes mentioned in the foregoing because it is obtained by using only the temporal variations of the focusing characteristic. Compared with the method of using the edge width detection value as it is, the method employed by the third embodiment gives a less degree of absolute variations.

Figure 13:
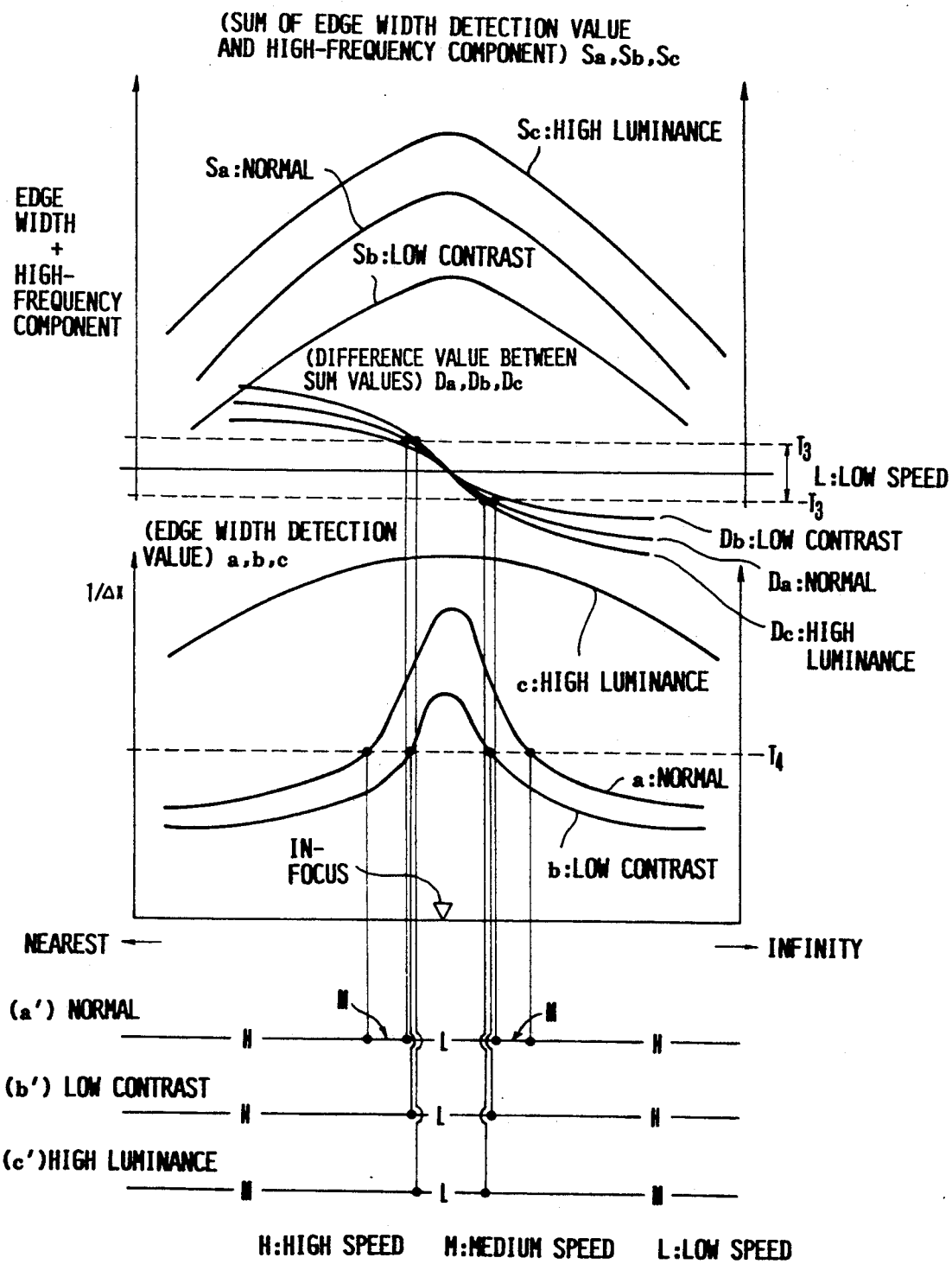
FIG. 13 shows the characteristic of a control operation on the focusing lens driving motor of the third embodiment.

Further, the edge width detection value and the high-frequency component value are added together before the above-stated difference value is obtained. The reason for this arrangement is as follows: Although the edge width detection value shows a sufficiently high level within the area near the in-focus point, the level becomes too low for detection within a wider range of area. Whereas, the above-stated arrangement enables the embodiment to have a characteristic which has a stable inclination from a greatly blurred point to the in-focus point. While some variations in the absolute value are still possible in this instance, such variations never have any adverse influence over the setting values of the focusing lens driving speeds as will be described in detail below with reference to FIG. 13:

In FIG. 13, reference symbols "a", "b" and "c" denote the edge width detection values output from the edge width detection circuit 7. Like in FIG. 12, a focusing characteristic curve "a" represents a normal focusing characteristic. A curve "b" represents a focusing characteristic obtained in the event of a low contrast. Another curve "c" represents a focusing characteristic obtained in the event of a high luminance. These curves are obtained with the position of the focusing lens shifted between a nearest distance position and an infinity distance position thereof.

Reference symbols Sa, Sb and Sc denote characteristic curves obtained by adding the high-frequency component output from the BPF 5 to the characteristic curves "a", "b" and "c" of the edge width detection values respectively under normal, low-contrast and high-luminance conditions. Symbols Da, Db and Dc denote characteristic curves representing difference values obtained by comparing the detected values of the characteristic curves Sa, Sb and Sc of the preceding field with those of the current field respectively.

As shown in FIG. 13, the characteristic curves "a", "b" and "c" of the edge width detection values and the characteristic curves Sa, Sb and Sc obtained by adding the high-frequency component values to the edge width detection values vary according to the condition of the object. Whereas, the characteristic curves Da, Db and Dc of the difference values show almost no variations in characteristic, because the difference values are obtained according to the temporal changes of detection values for each field in the characteristic curves. It is, therefore, apparent that the difference values show a constant characteristic without being affected by any change in contrast.

In the case of the third embodiment, therefore, the characteristic curves Da, Db and Dc are used for controlling the speed of the focusing lens driving motor 10 in the neighborhood of the in-focus point where a high degree of precision is required for motor control. In other words, the curves Da, Db and Dc are used in deciding change-over between the medium and low speeds. Meanwhile, the characteristic curves "a", "b" and "c" are used for the areas which deviate much from the in-focus point and show great errors in the difference value characteristic curve, because: The difference-value characteristic curve inclination is too unstable in the great blur area for obtaining accurate information and, therefore, it is difficult to correctly set the lens driving speed solely on the basis of the difference value. In the case of the third embodiment, the edge width detection value is used only for changing the lens driving speed from the high speed to the medium speed by setting a threshold value T4. This threshold value T4 for speed setting on the basis of the edge wide detection value is set at a value lower than the high-to-medium change-over threshold value T2 which is as shown in FIG. 12. In addition to that, the change-over threshold setting on the basis of the edge width detection value is arranged to be made only by one step (two steps according to the edge width, in the case of FIG. 12). Compared with the method shown in FIG. 12, this method is less easily affected by the variations of the edge width detection value.

Again referring to FIG. 13, in the greatly blurring area located much away from the in-focus point, the threshold value T4 which is smaller than the threshold value T2 of FIG. 12 is used for the characteristic curves "a", "b" and "c" representing the edge width detection values. In determining the area near the in-focus point and the intermediate area, the characteristic curves Da, Db and Dc representing the difference values of the sum values Sa, Sb and Sc of the edge width value and the high-frequency component value are used together with a threshold value T3.

When the edge width detection value $1/\Delta x$ (a, b or c) is less than the threshold value T4, the lens position is in the great blur area. In this instance, the driving speed of the focusing lens driving motor is set at a high speed H.

When the edge width detection value $1/\Delta x$ is above the threshold value T4 and the difference value (Da, Db or Dc) is either above the threshold value T3 or below the threshold value $-T3$, that is, when the difference value is above the value T3 in absolute value, the lens position is considered to be in an intermediate area between the area near the in-focus point and the great blue area. In that instance, the driving speed of the focusing lens driving motor is set at a medium speed M.

When the edge width detection value $1/\Delta x$ is above the threshold value T4 and the difference value (Da, Db or Dc) is below the value T3 or above the value $-T3$, that is, when the difference value is less than the value T3 in absolute value, the lens position is judged to be within the area near the in-focus point. Then, the driving speed of the focusing lens driving motor is set at a low speed L.

Therefore, as shown at parts (a'), (b') and (c') in FIG. 13, the speed control has an ideal characteristic for a normal object (a') because, in this instance, the speed is shifted stepwise from a high speed H to a medium speed M and further to a low speed L accordingly as the lens position comes from the great blue area toward the in-focus point.

The speed control for a low-contrast object (b') is performed as follows: The lens is driven at the high speed H for both the great blur area and the intermediate area and at the low speed L for the area near the in-focus point. Therefore, compared with the characteristic shown for the object (b") shown in FIG. 12, this control method gives a much greater degree of accuracy in stopping the focusing lens at the in-focus point.

For a high-luminance object (c'), the lens is driven at the medium speed M for both the great blur area and the intermediate area. The speed is not at the high speed H for the great blur area. However, compared with the characteristic for the high-luminance object (c") of FIG. 12, this speed control makes the focusing time much shorter. Besides, the lens is driven at the low speed L near the in-focus point to ensure that the focusing lens can be reliably brought to a stop at that point.

According to this arrangement, the device is not brought into a high driving speed mode in the event of a high degree of luminance. In this case, therefore, the medium speed driving area increases. In the case of low contrast, the medium speed driving area decreases and the high speed driving area increases. In all cases, however, the focusing lens driving motor can be driven at a low speed in the area near the in-focus point to ensure that the lens is accurately brought to a stop at the in-focus point without fail. Therefore, the focus adjusting action can be accurately and speedily accomplished without hunting at the in-focus point and without requiring an excessively long period of time.

As mentioned above, the focusing lens driving speed is set by using the value of a difference between one field and another in the sum of the detected value of the edge width of an object image and the extracted value of the high-frequency component. This arrangement ensures that the focusing lens driving control can be accomplished almost in an ideal manner for any object. With the device arranged in this manner, a focusing operation can be performed with a good operation feeling.

The overall operation of the automatic focus adjusting device which is arranged according to this invention as described above is described below with reference to FIG. 15 which is a flow chart:

As mentioned in the foregoing, the control over the focus adjusting action is performed by the system (logic) control part 18. At steps S1 and S2 of FIG. 15: After the commencement of the focus adjusting action, the peak values of the high-frequency component extracted by the BPF 5 and the edge width detection value output from the edge width detection circuit 7 are A/D-converted. The digital peak values thus obtained are then taken into the control part 18 in a cycle of field period. Step S3: The peak value of the high-frequency component and that of the edge width detection value are added together to obtain the characteristic curve Sa, Sb or Sc as shown in FIG. 13. Step S4: Following this, the difference in the sum of the detected values is obtained for every field to obtain the characteristic curve Da, Db or Dc as shown in FIG. 13. The flow of operation then shifts to a motor speed control routine which is executed as follows.

Step S5: For the characteristic curve "a", "b" and "c" of FIG. 13, the edge width detection value is compared with the threshold value which is set for changeover to the high or medium speed. If the edge width value is found to be less than the threshold value T4, the flow of operation comes to a step S14. At the step S14, an instruction is sent to the driving circuit 9 to cause the focusing lens driving motor 10 to be driven at the high speed.

Step S6: If the edge width detection value is found to be above the threshold value T4, the absolute value of the difference value obtained at the step S4 is compared with the threshold value T3. If the absolute value of the difference value is found to be less than the threshold value T3, it indicates that the lens position is near the in-focus point as shown by the difference value characteristic curve Da, Db or Dc. In that case, the flow comes to a step S15. At the step S15, the driving circuit 9 is instructed to cause the focusing lens driving motor 10 to drive the lens at the low speed. Further, if the absolute value of the difference value is found to be above the threshold value T3 at the step S6, the flow proceeds to a step S7. Step S7: The driving circuit 9 is instructed to cause the focusing lens driving motor 10 to drive the lens at the medium speed.

Step S8: With the driving speed of the focusing lens driving motor 10 determined as mentioned above, the lens position is discriminated, on the basis of the polarity of the difference value, between a near-focus state and a far-focus state. By this, the direction in which the focusing lens group 1 is to be driven by the focusing lens driving motor 10 is determined. Step S9: The lens group 1 is driven by the focusing lens driving motor 11 toward the in-focus point according to the driving speed and the driving direction thus determined.

Step S10: A check is made for the in-focus point at which the difference value becomes zero according to the difference value characteristic curve Da, Db or Dc shown in FIG. 13. Step S11: If the lens position is found to be in focus, the focusing lens driving motor 10 is brought to a stop. If the lens position is found to be still out of focus, the flow of operation comes back to the step S1 to repeat the above-stated control steps until the in-focus point is attained.

Further, after the focusing lens driving motor 10 is brought to a stop with the in-focus point attained, the focus determining action is continued using the difference value characteristic curve Da, Db or Dc or the edge width detection value "a", "b" or "c" to obtain basic data for determining the necessity of restarting the focus adjusting operation. Step S12: The detected value of the high-frequency component and that of the edge width are read. Step S13: A check is made to find if the focus adjusting operation must be restarted. If so, the flow comes back to the step S1 to repeat the steps of the focus adjusting operation described above. If not, the flow comes back to the step S12 to obtain the results of detection necessary for determining the necessity of restarting the focus adjusting operation. After that, the flow comes to the step S13 to determine the necessity of restart. This flow of operation is repeated thereafter.

In accordance with the arrangement of the third embodiment, the value of a difference occurring in the sum of the detection value of the edge of an object image and that of the the high-frequency component included in the video signal is obtained. Then, the driving speed of the focusing lens driving motor is set on the basis of the difference value thus obtained. The detection value of the high-frequency component is not limited to the value of high-frequency component extracted by a single band-pass filter. The values of high-frequency component extracted by a plurality of band-pass filters may be mixed and added together and a sum thus obtained may be used as the detection value of the high-frequency component in computing the above-stated difference value.

Further, the embodiment described is arranged to use means for setting the lens driving speed of the focusing lens driving motor according to the edge width detection values (the characteristic curves "a", "b" and "c" of FIG. 13). The arrangement, however, may be changed to use the absolute values of the sum values Sa, Sb and Sc shown in FIG. 13 in place of the edge width detection values.

Further, the embodiment is arranged to compare the sum of the edge width detection value and the high-frequency component extraction value obtained for a previous or preceding field with the sum obtained for the current field in obtaining the difference value. However, the detection cycle is not limited to one field. For example, the detection may be made in a cycle of several fields in stead of one. In accordance with this invention, the aperture value is detected by means of the aperture encoder 12. Therefore, the lens driving motor can be controlled according to the depth of field. In other words, in the event of a deep depth of field, the focused state is changed to a less degree by the same lens shifting degree than in the case of a normal depth of field. Therefore, in that event, the focus can be controlled at longer intervals.

As described in the foregoing, the automatic focus adjusting device according to this invention is arranged to control the driving speed of the focus adjusting system on the basis of variations in the detected value of the edge width of the object image and also on the basis of variations in the sum value obtained by adding together the detected value of the edge width and that of the high-frequency component. This arrangement enables the device to accurately accomplish a focusing action irrespectively of the kind and the condition of the object, that is, even for a high-luminance object or for a low-contrast object. The device is advantageous particularly in that the lens driving speed is lowered without fail in the neighborhood of the in-focus point. Therefore, the automatic focus adjusting action can be speedily and accurately accomplished without faulty actions due to hunting, etc..

What is claimed is:

1. An automatic focus adjusting device comprising:
   (a) image sensing means for converting an object image formed on an image sensing plane by a photo-taking lens optical system into a video signal;
   (b) first detecting means for detecting a predetermined high-frequency component from the video signal;
   (c) second detecting means for detecting, from the video signal, a signal corresponding to the sharpness of an edge part of object image;
   (d) driving means for driving and varying the position of said photo-taking lens optical system relative to said image sensing plane in the direction in which said high-frequency component and an output level of said signal corresponding to the sharpness of the edge part increase; and
   (e) control means for controlling the driving speed of said driving means among plural predetermined driving speeds according to the output of said second detecting means and for controlling change of a threshold value set to be used in changing and selecting said driving speed from said plural predetermined driving speeds according to the depth of field.

2. A device according to claim 1, wherein said second detecting means is arranged to detect a signal related to the edge width of said edge part.

3. A device according to claim 2, wherein said signal related to said edge width is a normalized signal which is unaffected by the contrast of the object image.

4. A device according to claim 1, wherein said driving means is arranged to drive said photo-taking lens optical system; and said control means is arranged to change the driving speed of said driving means by a plurality of steps according to an output of said second detecting means.

5. A drive according to claim 1, wherein said control means is arranged to change said driving speed at least by three steps in such a way as to have the lowest speed when the focus position of said optical system is in the neighborhood of an in-focus point.

6. An automatic focus adjusting device comprising:
   (a) image sensing means for converting an object image formed on an image sensing plane by a photo-taking lens optical system into a video signal;
   (b) first detecting means for detecting, from the video signal, a first focus signal which corresponds to a high-frequency component of the video signal;
   (c) second detecting means for detecting, from the video signal, a second focus signal which represents the sharpness of an edge part of object image;
   (d) driving means for varying the position of said photo-taking lens optical system relative to said image sensing plane in the direction in which output levels of said first and second focus signals increase; and
   (e) control means for controlling the driving speed of said driving means among plural predetermined driving speeds according to the output level of said second focus signal and the depth of field of said photo-taking lens optical system, said control means being arranged to change threshold levels set to be used in changing and selecting said driving speeds from among said plural predetermined driving speeds according to the depth of field.

7. A device according to claim 6, wherein said control means is arranged to change the driving speed of said driving means at least by three steps.

8. A device according to claim 6, wherein said control means is arranged to change said speed changing threshold values, in such a way as to keep the driving speed change-over position of said photo-taking lens optical system unvarying relative to an in-focus point, in accordance with the shape of a focusing characteristic curve which varies with the depth of field.

9. An automatic focus adjusting device comprising:
a) detecting means for detecting, from a video signal, a signal corresponding to a focused condition;
b) speed control means for changing a focus adjusting speed by comparing an output of said detecting means with a predetermined threshold value; and
c) means for varying said threshold value according to the depth of field so as to adaptively change said focus adjusting speed on the basis of the signal detected by said detecting means.

10. A device according to claim 9, wherein said speed control means is arranged to control said focus adjusting speed at least in three steps.

11. A device according to claim 9, wherein said signal corresponding to the focused condition is related to the edge width of an edge part of an object image.

12. A device according to claim 11, wherein said signal related to the edge width is normalized relative to luminance.

13. An automatic focus adjusting device comprising:
a) image sensing means for converting an object image formed on an image sensing plane by a photo-taking lens optical system into a video signal;
b) focus detecting means for detecting from the video signal a predetermined signal component which corresponds to a focused condition;
c) high-luminance detecting means for detecting a high-luminance part of said image sensing plane;
d) driving means for varying the position of said photo-taking lens optical system relative to said image sensing plane according to an output of said focus detecting means; and
e) control means for controlling and changing the driving speed of said driving means according to an output of said focus detecting means and an output of said high-luminance detecting means.

14. A device according to claim 13, wherein said control means is arranged to compare the level of the output of said focus detecting means with a predetermined threshold value, to select the driving speed of said driving means according to the result of comparison and to vary said speed changing threshold value according to the output of said high-luminance detecting means.

15. A device according to claim 14, wherein said control means is arranged to vary said threshold value in such a way as to keep the driving speed change-over positions of said driving means unvarying relative to an in-focus point when the shape of a focusing characteristic curve is changed by a high degree of luminance.

16. A device according to claim 13, wherein said focus detecting means includes a first detecting means for detecting a high-frequency component of the video signal and a second detecting means for detecting information on the width of an edge part of the object image, and wherein said control means is arranged to select said driving speed by comparing the output level of said second detecting means with a predetermined threshold value.

17. A device according to claim 13, wherein said high-luminance detecting means includes a voltage comparator which compares the luminance level of the video signal with a predetermined reference level, and wherein the high-luminance part is determined when said voltage comparator detects that the luminance level exceeds said reference level.

18. A device according to claim 15, wherein said control means is further arranged to vary said threshold value according to the depth of field of said photo-taking lens optical system.

19. An automatic focus adjusting device comprising:
a) image sensing means for converting an object image formed on an image sensing plane by a photo-taking lens optical system into a video signal;
b) first detecting means for detecting a high-frequency component from the video signal;
c) second detecting means for detecting, from the video signal, a signal corresponding to the sharpness of an edge part of the object image;
d) third detecting means for detecting, from the video signal, a high-luminance part on said image sensing plane;
e) driving means for varying the position of said photo-taking lens optical system relative to said image sensing plane in the direction in which output levels of said first and second detecting means increase;
f) control means arranged to compare with a predetermined threshold value the level of the signal output from said second detecting means and corresponding to the sharpness of the edge part, and to change the driving speed of said driving means according to the result of comparison; and
g) correction means for varying the setting of said threshold value according to an output of said third detecting means.

20. A device according to claim 19, wherein said control means is arranged to change the driving speed of said driving means at least by three steps according to the output of said second detecting means.

21. A device according to claim 20, wherein said correction means is arranged to change said threshold value in such a way as to keep the driving speed change-over position of said driving means unvarying relative to an in-focus point when the shape of a focusing characteristic curve is changed by a high degree of luminance.

22. A device according to claim 19, further comprising second correction means for changing said driving speed changing threshold value according to the depth of field of said photo-taking lens optical system.

23. An automatic focus adjusting device comprising:
a) image sensing means for converting an object image formed on an image sensing plane by a photo-taking lens optical system into a video signal;
b) focus adjusting means for adjusting the position of said photo-taking lens optical system relative to said image sensing plane;
c) first detecting means for detecting from the video signal a first focus signal which corresponds to a focused state;

d) second detecting means for detecting from the video signal a second focus signal the characteristic of which differs from that of said first focus signal;

e) third detecting means for obtaining a third focus signal by adding said first and second focus signals; and f) control means for controlling the driving speed of said focus adjusting means by using said third focus signal and at least one of said first and second focus signals.

24. A device according to claim 23, wherein said first focus signal is a high-frequency component of the video signal, and wherein said second focus signal is a signal component of the video signal related to the width of an edge part of the object image.

25. A device according to claim 24, wherein said control means is arranged to control the driving speed of said focus adjusting means on the basis of said second focus signal and a difference value of said third focus signal resulting from temporal changes thereof.

26. A device according to claim 25, wherein said control means is arranged to drive said focus adjusting means at a high speed when the level of said second focus signal is below a first threshold value.

27. A device according to claim 25, wherein said control means is arranged to control the driving speed of said focus adjusting means by comparing said difference value with a second threshold value when the level of said second focus signal is above a first threshold value.

28. A device according to claim 20, wherein said control means is arranged to set the driving speed of said focus adjusting means at a medium speed if said difference value is above a second threshold value when the level of said second focus signal is above said first threshold value.

29. A device according to claim 26, wherein said control means is arranged to set the driving speed of said focus adjusting means at a low speed if said difference value is below a second threshold value when the level of said second focus signal is above said first threshold value.

30. A device according to claim 25, wherein said control means is arranged to determine the driving direction of said focus adjusting means according to the polarity of said difference value.

* * * * *

UNITED STATES PATENT AND TRADEMARK OFFICE
CERTIFICATE OF CORRECTION

PATENT NO. : 5,212,516

DATED : May 18, 1993

INVENTOR(S) : Kunihiko Yamada, et al.

It is certified that error appears in the above-identified patent and that said Letters Patent is hereby corrected as shown below:

Col. 1, line 7.  Insert -- Background of the Invention:
                         Field of the Invention:
                         This invention relates to an automatic focus adjusting device highly suited for a video camera --

Col. 1, line 23.  Delete "through"

Col. 2, line 6.  Delete "to"

Col. 2, line 35.  Change "component" to -- components --

Col. 2, line 67.  Change "irrespectively" to -- irrespective --

Col. 2, line 68.  Delete "the"

Col. 3, lines 56, 63.  Change "irrespectively" to -- irrespective --

Col. 4, lines 10, 48, 62.  Change "irrespectively" to -- irrespective --

Col. 4, line 49.  Delete "the"

Col. 7, line 10.  After "system" insert -- 1 --

Col. 7, line 23.  Change "irrespectively" to -- irrespective --

Col. 7, line 29.  Change "1" to -- $\ell$ --

Col. 8, line 22.  Change "1/x" to -- $1/\Delta x$ --

Col. 8, line 27.  Change "and" to -- or --

Col. 9, line 20.  Change "irrespectively" to -- irrespective --

Col. 9, line 25.  Change "less" to -- lesser --

UNITED STATES PATENT AND TRADEMARK OFFICE
CERTIFICATE OF CORRECTION

PATENT NO. : 5,212,516
DATED : May 18, 1993
INVENTOR(S) : Kunihiko Yamada, et al.

It is certified that error appears in the above-identified patent and that said Letters Patent is hereby corrected as shown below:

Col. 9, line 63.     Change ". The" to -- , the --

Col. 10, lines 6, 16.     Change "irrespectively" to -- irrespective --

Col. 10, line 39.     Change "highluminance" to -- high-luminance --

Col. 11, line 66.     After "of" insert -- a --

Col. 13, line 17.     Change "irrespectively" to -- irrespective --

Col. 13, line 22.     Change "less" to -- lesser --

Col. 13, line 33.     Change "results" to -- result --

Col. 14, line 15.     Change "irrespectively" to -- irrespective --

Col. 17, line 22.     Delete "output" (second occurrence)

Col. 17, line 42.     Change "less" to -- lesser --

Col. 21, line 15.     Delete "the" (second occurrence)

Col. 21, line 42.     Change "in stead" to -- instead --

Col. 21, line 47.     Change "less" to -- lesser --

Col. 21, line 60.     Change "irrespectively" to -- irrespective --

UNITED STATES PATENT AND TRADEMARK OFFICE
CERTIFICATE OF CORRECTION

PATENT NO. : 5,212,516

DATED : May 18, 1993

INVENTOR(S) : Kunihiko Yamada, et al.

It is certified that error appears in the above-identified patent and that said Letters Patent is hereby corrected as shown below:

Column 26, line 9, change "20" to --26--.

Signed and Sealed this

Twenty-second Day of February, 1994

Attest:

BRUCE LEHMAN

*Attesting Officer*  *Commissioner of Patents and Trademarks*